US012521854B2

(12) United States Patent
Bierdeman et al.

(10) Patent No.: US 12,521,854 B2
(45) Date of Patent: Jan. 13, 2026

(54) GAS SPRING-POWERED FASTENER DRIVER WITH PRESSURE MECHANISM

(71) Applicant: MILWAUKEE ELECTRIC TOOL CORPORATION, Brookfield, WI (US)

(72) Inventors: David A. Bierdeman, New Berlin, WI (US); Troy C. Thorson, Cedarburg, WI (US); Jacob N. Zimmerman, Pewaukee, WI (US); Andrew R. Wyler, Pewaukee, WI (US); Travis W. Leathrum, Milwaukee, WI (US); David C. Graf, Greendale, WI (US); Alex J. Brasel, Greenfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/577,004

(22) PCT Filed: Jul. 15, 2022

(86) PCT No.: PCT/US2022/037337
§ 371 (c)(1),
(2) Date: Jan. 5, 2024

(87) PCT Pub. No.: WO2023/288083
PCT Pub. Date: Jan. 19, 2023

(65) Prior Publication Data

US 2024/0308042 A1 Sep. 19, 2024

Related U.S. Application Data

(60) Provisional application No. 63/332,480, filed on Apr. 19, 2022, provisional application No. 63/237,494,
(Continued)

(51) Int. Cl.
*B25C 1/00* (2006.01)
*B25C 1/04* (2006.01)
*B25C 1/06* (2006.01)

(52) U.S. Cl.
CPC .............. *B25C 1/008* (2013.01); *B25C 1/047* (2013.01); *B25C 1/06* (2013.01)

(58) Field of Classification Search
CPC ........... B25C 1/008; B25C 1/047; B25C 1/06; B25C 1/04; B25C 1/041; B25C 1/042
See application file for complete search history.

(56) References Cited

U.S. PATENT DOCUMENTS 2,381,171 A 8/1945 Little et al.
2,527,759 A 10/1950 Pierson
(Continued)

FOREIGN PATENT DOCUMENTS

CN 202412390 U 9/2012
CN 102292192 B 10/2014
(Continued)

OTHER PUBLICATIONS

International Search Report and Written Opinion for Application No. PCT/US2022/037337 dated Nov. 15, 2022 (18 pages).

*Primary Examiner* — Veronica Martin
(74) *Attorney, Agent, or Firm* — Michael Best & Friedrich LLP

(57) ABSTRACT

A gas spring-powered fastener driver includes a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade
(Continued)

when moving the driver blade from the bottom-dead-center position toward the top-dead-center position, a bumper positioned beneath the piston in a vertical direction to absorb impact energy from the piston, and a valve positioned in the storage chamber cylinder. In response to the piston compressing the bumper while absorbing impact energy from the piston, the valve adds pressurized air from the cylinder to the storage chamber cylinder.

13 Claims, 32 Drawing Sheets

Related U.S. Application Data filed on Aug. 26, 2021, provisional application No. 63/222,606, filed on Jul. 16, 2021.

(56) References Cited

U.S. PATENT DOCUMENTS

| | | | |
|---|---|---|---|
| 2,761,157 | A | 9/1956 | Chism |
| 3,023,014 | A | 2/1962 | Donner |
| 3,027,875 | A | 4/1962 | Spencer |
| 3,055,008 | A | 9/1962 | Bell et al. |
| 3,060,440 | A | 10/1962 | Pfaff et al. |
| 3,084,672 | A | 4/1963 | Dalton |
| 3,112,489 | A | 12/1963 | Beckman et al. |
| 3,181,566 | A | 5/1965 | Volkmann |
| 3,211,352 | A | 10/1965 | Anstett |
| 3,278,103 | A | 10/1966 | Juilfs et al. |
| 3,313,213 | A | 4/1967 | Wandel |
| 3,320,860 | A | 5/1967 | Emil |
| RE26,262 | E | 9/1967 | Juilfs et al. |
| 3,375,758 | A | 4/1968 | Novak et al. |
| 3,387,541 | A | 6/1968 | Bade |
| 3,403,600 | A | 10/1968 | Emil |
| 3,427,928 | A | 2/1969 | Bade |
| 3,527,142 | A | 9/1970 | Obergfell |
| 3,572,211 | A | 3/1971 | Doyle |
| 3,622,062 | A | 11/1971 | Goode, Jr. et al. |
| 3,673,922 | A | 7/1972 | Doyle |
| 3,730,481 | A | 5/1973 | Ekonen et al. |
| 3,772,493 | A | 11/1973 | Iten |
| 3,788,195 | A | 1/1974 | Lange |
| 4,089,533 | A | 5/1978 | Knudson et al. |
| 4,188,858 | A | 2/1980 | Plunkett |
| 4,401,251 | A | 8/1983 | Nikolich |
| 4,485,956 | A | 12/1984 | Van Iperen |
| 4,499,813 | A | 2/1985 | Lampert |
| 4,679,719 | A * | 7/1987 | Kramer ..................... B25C 1/04 227/5 |
| 5,181,450 | A | 1/1993 | Monacelli |
| 5,775,201 | A | 7/1998 | Tanji et al. |
| 5,791,712 | A | 8/1998 | Hawn |
| 6,206,248 | B1 | 3/2001 | Popp et al. |
| 6,340,160 | B1 | 1/2002 | Younger |
| 6,830,017 | B2 | 12/2004 | Wolf et al. |
| 7,201,302 | B2 | 4/2007 | Panasik et al. |
| 7,322,501 | B2 | 1/2008 | Ishizawa et al. |
| 7,896,101 | B2 | 3/2011 | Wakabayashi et al. |
| 7,918,375 | B2 | 4/2011 | Johnson et al. |
| 9,206,608 | B2 | 12/2015 | Gevorgian |
| 9,377,043 | B2 | 6/2016 | Foser et al. |
| 9,573,260 | B2 | 2/2017 | Walters, Jr. et al. |
| 9,662,777 | B2 | 5/2017 | Pomeroy et al. |
| 9,844,864 | B2 | 12/2017 | Zhao et al. |
| 10,759,031 | B2 | 9/2020 | Wong et al. |
| 10,843,318 | B2 | 11/2020 | Kobori et al. |
| 10,875,166 | B2 | 12/2020 | Ueda |
| 10,946,506 | B1 | 3/2021 | Ueda |
| 10,967,491 | B2 | 4/2021 | Yasutomi et al. |
| 11,273,545 | B2 | 3/2022 | Ueda |
| 11,466,815 | B2 | 10/2022 | Rigdon et al. |
| 11,559,876 | B2 | 1/2023 | Po |
| 2002/0108994 | A1 | 8/2002 | Burke et al. |
| 2003/0029898 | A1 | 2/2003 | Rosenbaum et al. |
| 2005/0121491 | A1 | 6/2005 | Chang |
| 2010/0034618 | A1 | 2/2010 | Foser et al. |
| 2011/0198381 | A1 | 8/2011 | McCardle et al. |
| 2011/0290850 | A1 | 12/2011 | Wu |
| 2012/0153003 | A1 | 6/2012 | Dittrich |
| 2012/0297722 | A1 | 11/2012 | Gevorgian |
| 2013/0221626 | A1 | 8/2013 | Lee |
| 2015/0129248 | A1 | 5/2015 | Nitsche et al. |
| 2016/0059398 | A1 | 3/2016 | Wong et al. |
| 2016/0303724 | A1 | 10/2016 | Dittrich et al. |
| 2017/0087703 | A1 | 3/2017 | Moore |
| 2018/0036870 | A1 | 2/2018 | Komazaki et al. |
| 2018/0036871 | A1 | 2/2018 | Cordeiro et al. |
| 2018/0236646 | A1 | 8/2018 | Raggl et al. |
| 2019/0381643 | A1 | 12/2019 | Fan |
| 2020/0114500 | A1 | 4/2020 | Bierdeman et al. |
| 2020/0215672 | A1* | 7/2020 | Pomeroy ................. B25C 1/047 |
| 2020/0238493 | A1 | 7/2020 | Wierzchon |
| 2020/0282534 | A1 | 9/2020 | Po |
| 2020/0406439 | A1 | 12/2020 | Fujimoto et al. |
| 2021/0031348 | A1 | 2/2021 | Kobori et al. |
| 2021/0197352 | A1 | 7/2021 | Ueda |
| 2021/0213595 | A1 | 7/2021 | Yasutomi et al. |
| 2021/0237242 | A1 | 8/2021 | Carrier |
| 2021/0245345 | A1 | 8/2021 | Ueda et al. |
| 2021/0308849 | A1 | 10/2021 | Ruecklinger |
| 2022/0063074 | A1 | 3/2022 | Wierzchon et al. |
| 2022/0176532 | A1 | 6/2022 | Nakajima et al. |
| 2022/0355460 | A1 | 11/2022 | Carrier |
| 2023/0077335 | A1 | 3/2023 | Skjoldhammer et al. |
| 2023/0122029 | A1 | 4/2023 | Bierdeman et al. |

FOREIGN PATENT DOCUMENTS

| | | | |
|---|---|---|---|
| CN | 203963454 | U | 11/2014 |
| CN | 112677109 | A | 4/2021 |
| CN | 214007662 | U | 8/2021 |
| CN | 214643366 | U | 11/2021 |
| CN | 114161367 | A | 3/2022 |
| CN | 217097626 | U | 8/2022 |
| CN | 217097627 | U | 8/2022 |
| DE | 3728454 | A1 | 3/1989 |
| DE | 3730048 | A1 | 3/1989 |
| EP | 0584395 | A1 | 3/1994 |
| WO | 2011010511 | A1 | 1/2011 |
| WO | 2011010512 | A1 | 1/2011 |
| WO | 2011010634 | A1 | 1/2011 |
| WO | 2015037299 | A1 | 3/2015 |
| WO | 2016158130 | A1 | 10/2016 |
| WO | 2016174995 | A1 | 11/2016 |
| WO | 2021192838 | A1 | 9/2021 |

* cited by examiner

GAS SPRING-POWERED FASTENER DRIVER WITH PRESSURE MECHANISM

CROSS-REFERENCE TO RELATED APPLICATIONS

This application is a national stage filing under 35 U.S.C. § 371 of International Application No. PCT/US2022/037337, filed on Jul. 15, 2022, which claims priority to U.S. Provisional Patent Application No. 63/332,480, filed on Apr. 19, 2022, U.S. Provisional Patent Application No. 63/237,494, filed on Aug. 26, 2021, and U.S. Provisional Patent Application No. 63/222,606, filed on Jul. 16, 2021, the entire contents of all of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints. One factor that existing fastener drivers do not account for relates to solving pressure loss over tool life and/or fluctuating pressure based on external temperatures. While an onboard air compressor may help alleviate pressure loss, typical air compressors (e.g., reciprocating, axial, screw, or centrifugal compressors) would add significant complexity, cost, and weight to the tool and therefore are unreasonable options.

SUMMARY OF THE INVENTION

The present invention provides, in one aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, a bumper positioned beneath the piston in a vertical direction to absorb impact energy from the piston, and a valve positioned in the storage chamber cylinder. In response to the piston compressing the bumper while absorbing impact energy from the piston, the valve adds pressurized air from the cylinder to the storage chamber cylinder.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, a bumper positioned beneath the piston in a vertical direction to absorb impact energy from the piston. and a valve positioned in the storage chamber cylinder. When the pressure within the storage chamber cylinder reaches a predetermined level, the valve opens.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and a valve positioned between the cylinder and the storage chamber cylinder. The valve is a two-way valve, allowing air to flow from the cylinder to the storage chamber cylinder and from the storage chamber cylinder to the cylinder.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and a glow plug positioned within the storage chamber cylinder. The glow plug heats the air within the storage chamber cylinder when a pressure of the air within the storage chamber cylinder is below a predetermined level.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, a tank separator positioned within the storage chamber cylinder. The tank separator is moved in response to a pressure of the air within the storage chamber cylinder reaching a predetermined level. When the tank separator is moved, a volume of the cylinder increases or decreases.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and an auxiliary tank fluidly coupled to the storage chamber cylinder and including a valve. The valve opens in response to the pressure of the air within the storage chamber cylinder reaching a predetermined pressure.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and a pressure adjuster fluidly coupled to the storage chamber cylinder and including an adjustable portion. When the adjustable portion is adjusted, a volume of the storage chamber cylinder is changed.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and a pressure regulating system. The pressure regulating system includes a first check valve positioned in a wall of the cylinder, a second check valve positioned in the wall of the cylinder, and a third check valve disposed on a wall of the storage chamber cylinder.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, and a lifter operable to move the driver blade from the bottom-dead-center position toward the top-dead-center position, the lifter is configured to engage the driver blade when moving the driver blade from the bottom-dead-center position toward the top-dead-center position. The lifter turns between 16 and 18 times to move the piston from the bottom-dead-center position to the top-dead-center position.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and a sliding seal disposed between the piston and the cylinder. The sliding seal is configured to prevent pressurized air from passing through an annular space between the piston and the cylinder.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and a pressure release valve disposed between the cylinder and the storage chamber cylinder. The pressure release valve is adjustable from a closed state to an open state in response to a pressure of the air within the cylinder reaching a predetermined pressure, and wherein the pressure release valve, when in the open state, transfers air from the cylinder to the storage chamber cylinder.

The present invention provides, in another aspect, a gas spring-powered fastener driver including a cylinder, a storage chamber cylinder having pressurized air in communication with the cylinder, a moveable piston positioned within the cylinder, a driver blade attached to the piston and movable therewith between a top-dead-center position and a bottom-dead-center position, the driver blade defining a driving axis, a lifter operable to move the driver blade from the bottom-dead-center position toward the top-dead-center position, the lifter is configured to engage the driver blade when moving the driver blade from the bottom-dead-center position toward the top-dead-center position, and a pump driven by the lifter to discharge pressurized air into the storage chamber cylinder. The pump includes a pump piston driven by the lifter for reciprocating movement within a pump chamber, and a valve that selectively fluidly couples the pump chamber to the storage chamber cylinder to discharge the pressurized air within the pump chamber into the storage chamber cylinder.

Other features and aspects of the invention will become apparent by consideration of the following detailed description and accompanying drawings.

Figure 1:
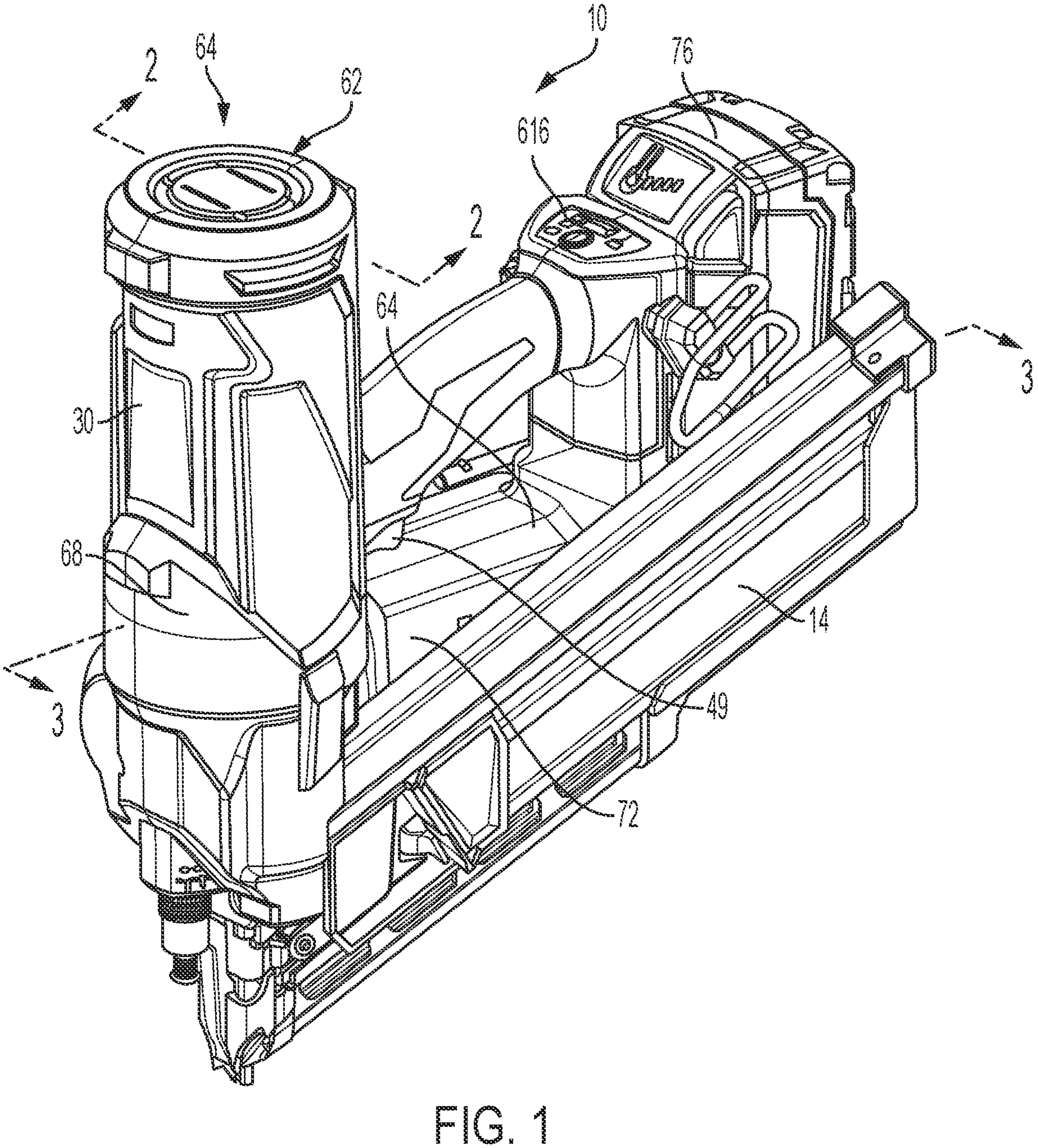
FIG. 1 is perspective view of a gas spring-powered fastener driver in accordance with embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

With reference to FIGS. 1-4, a gas spring-powered fastener driver 10 is operable to drive fasteners (e.g., singleheaded nails, double-headed or duplex nails, tacks, staples, etc.) held within a magazine 14 into a workpiece. The fastener driver 10 includes an inner cylinder 18 and a moveable piston 22 positioned within the cylinder 18 (FIG. 5). With reference to FIG. 5, the fastener driver 10 further includes a driver blade 26 that is attached to the piston 22 and moveable therewith. The fastener driver 10 does not require an external source of air pressure, and instead includes an outer storage chamber cylinder 30 of pressurized fluid (e.g., gas) in communication with the cylinder 18. In the illustrated embodiment, the cylinder 18 and the movable piston 22 are positioned within the storage chamber cylinder 30.

Figure 2:
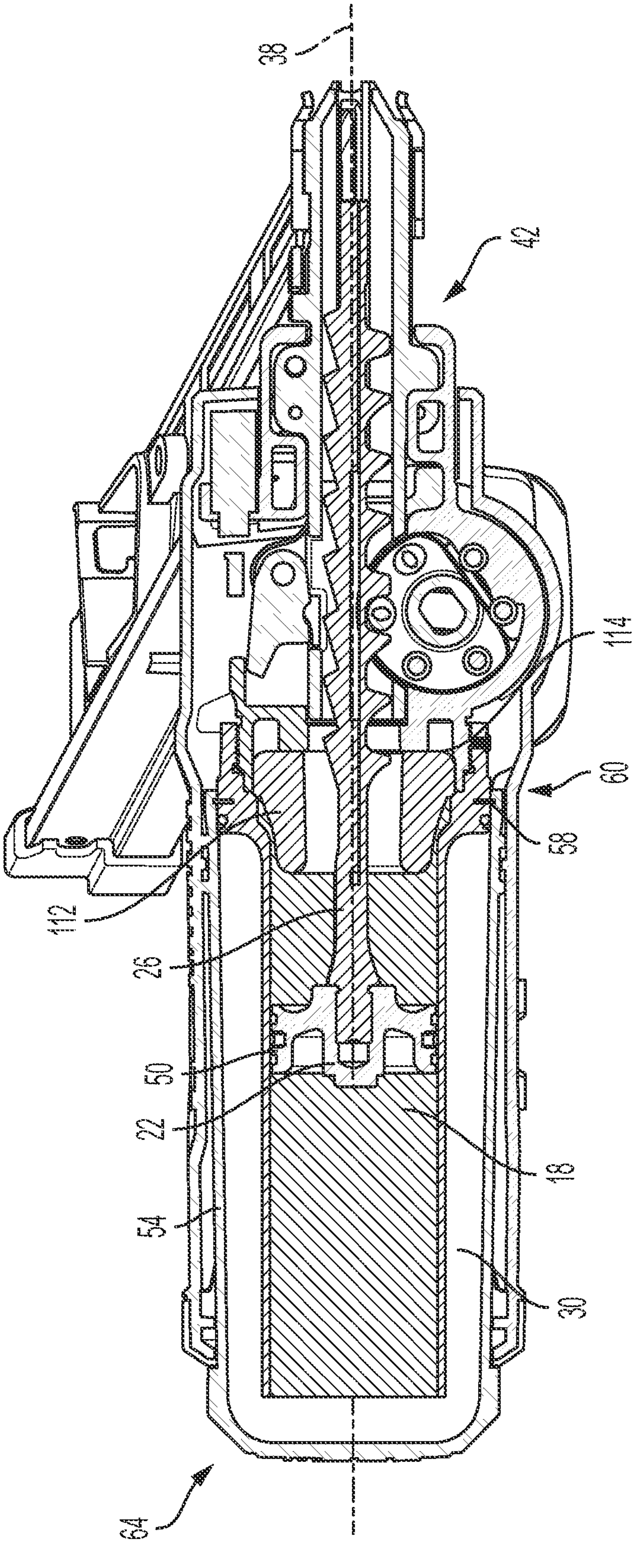
FIG. 2 is a partial cross-sectional view of the gas spring-powered fastener driver taken along line 2-2 in FIG. 1.
Figure 4:
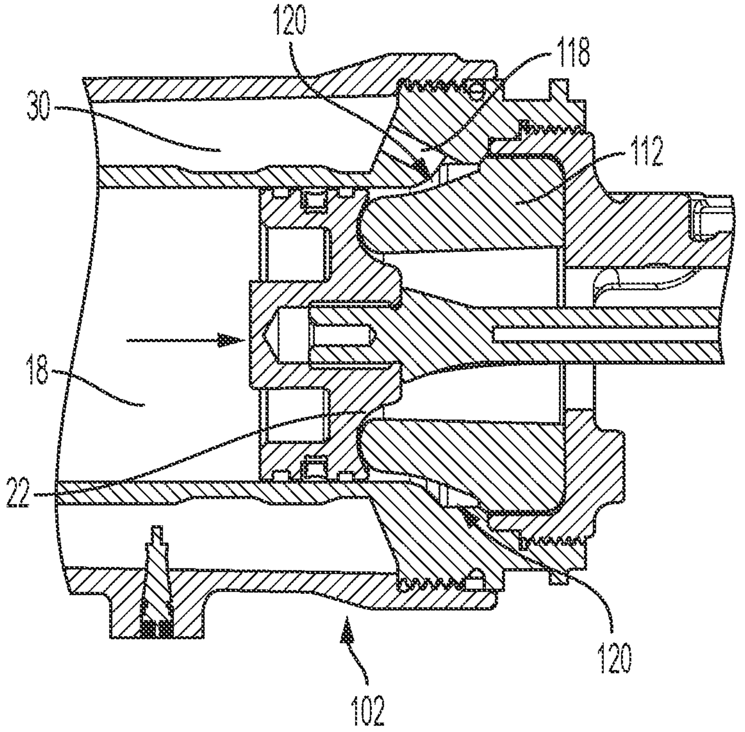
FIG. 4 is an enlarged cross-sectional view of a portion of the fastener driver illustrating a passageway for supplementing pressure in the fastener driver.
Figure 5:
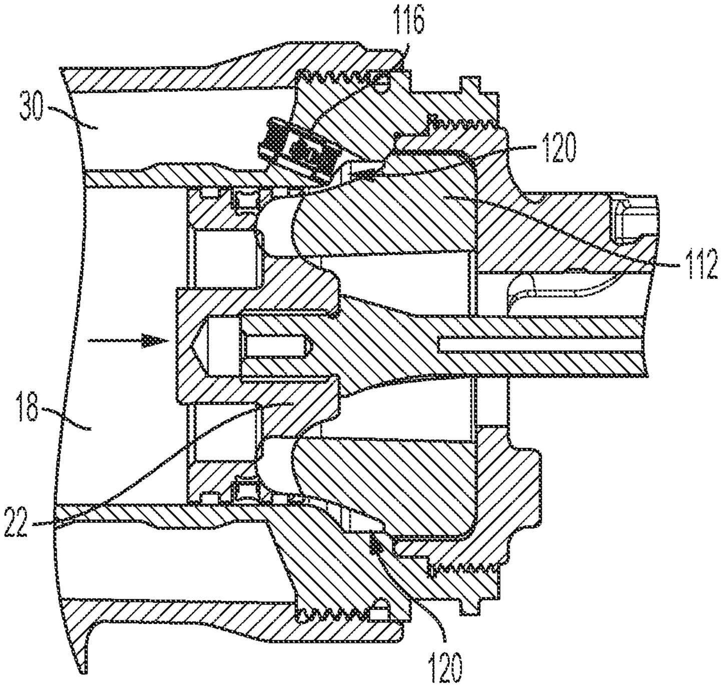
FIG. 5 is an enlarged cross-sectional view of a portion of the fastener driver similar to FIG. 4 and illustrating a check valve positioned in the passageway.
Figure 6A:
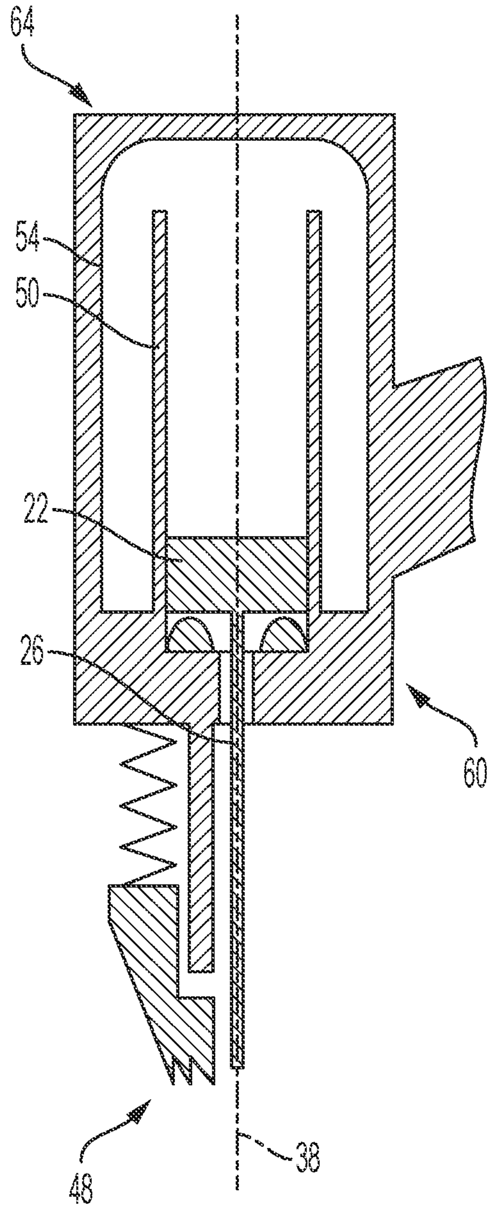
FIG. 6A is a schematic view of the gas spring-powered fastener driver of FIG. 1, illustrating a driver blade in a driven or bottom-dead-center position.
Figure 6B:
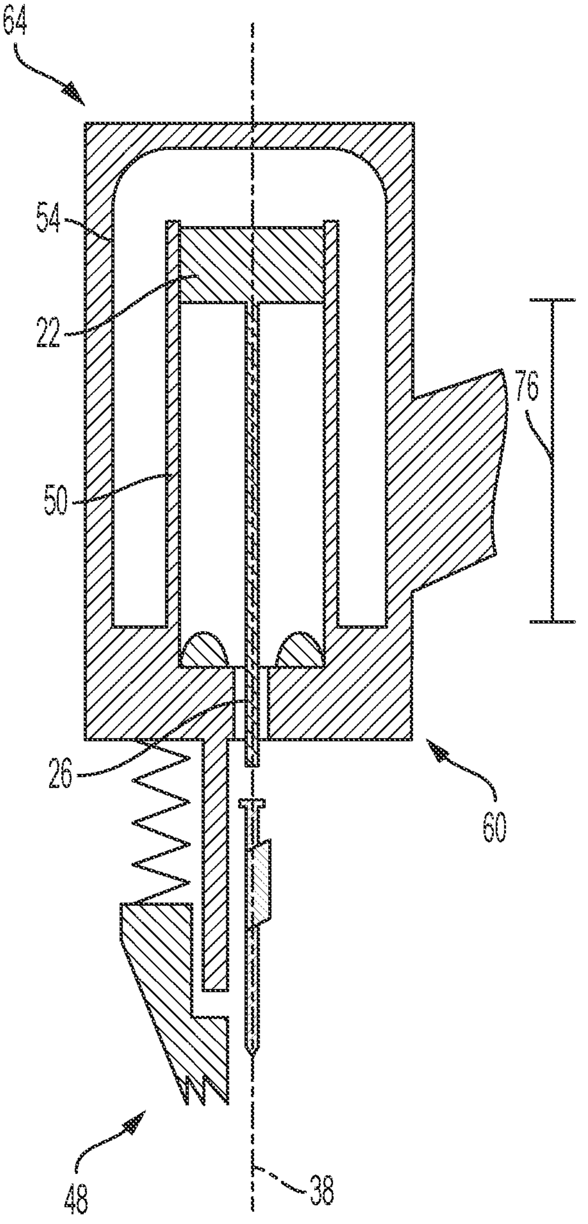
FIG. 6B is a schematic view of the gas spring-powered fastener driver of FIG. 1, illustrating a driver blade in a top-dead-center position prior to actuation.

With reference to FIGS. 2, 4, and 5, the cylinder 18 and the driver blade 26 define a driving axis 38. As shown in FIGS. 6A and 6B, during a driving cycle the driver blade 26 and the piston 22 are moveable between a top-dead-center position (FIG. 6B) and a driven or bottom-dead-center position (FIG. 6A). FIG. 2 and illustrate that the fastener driver 10 further includes a lifter assembly 42 that is powered by a motor 46 and that is operable to move the driver blade 26 from the driven position to the top-dead-center position. The driver 10 also includes a latch assembly 48 that selectively holds the driver blade 26 in the ready position.

In operation, the lifter assembly 42 drives the piston 22 and the driver blade 26 toward the top-dead-center position by energizing the motor 46. As the piston 22 and the driver blade 26 are driven toward the top-dead-center position, the gas above the piston 22 and the gas within the storage chamber cylinder 30 is compressed. Prior to reaching the top-dead-center position, the motor 46 is deactivated and the piston 22 and the driver blade 26 are held in a ready position, which is located between the top-dead-center and the bottom-dead-center or driven positions, until being released by user activation of a trigger 49. When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifter assembly 42 and the piston 22 to further compress the gas within the cylinder 18 and the storage chamber cylinder 30.

With reference to FIGS. 2 and 6A-6B, the storage chamber cylinder 30 is concentric with the cylinder 18. The cylinder 18 has an annular inner wall 50 that guides the piston 22 and the driver blade 26 along the driving axis 38 to compress the gas in the storage chamber cylinder 30. The storage chamber cylinder 30 has an annular outer wall 54 circumferentially surrounding the inner wall 50. The cylinder 18 has a threaded section 58 (FIG. 2). The storage chamber cylinder 30 has corresponding threads at a lower end 60 of the storage chamber cylinder 30 such that the cylinder 18 is threaded to the storage chamber cylinder 30 at the lower end 60. As such, the cylinder 18 is configured to be axially secured to the storage chamber cylinder 30.

Figure 3:
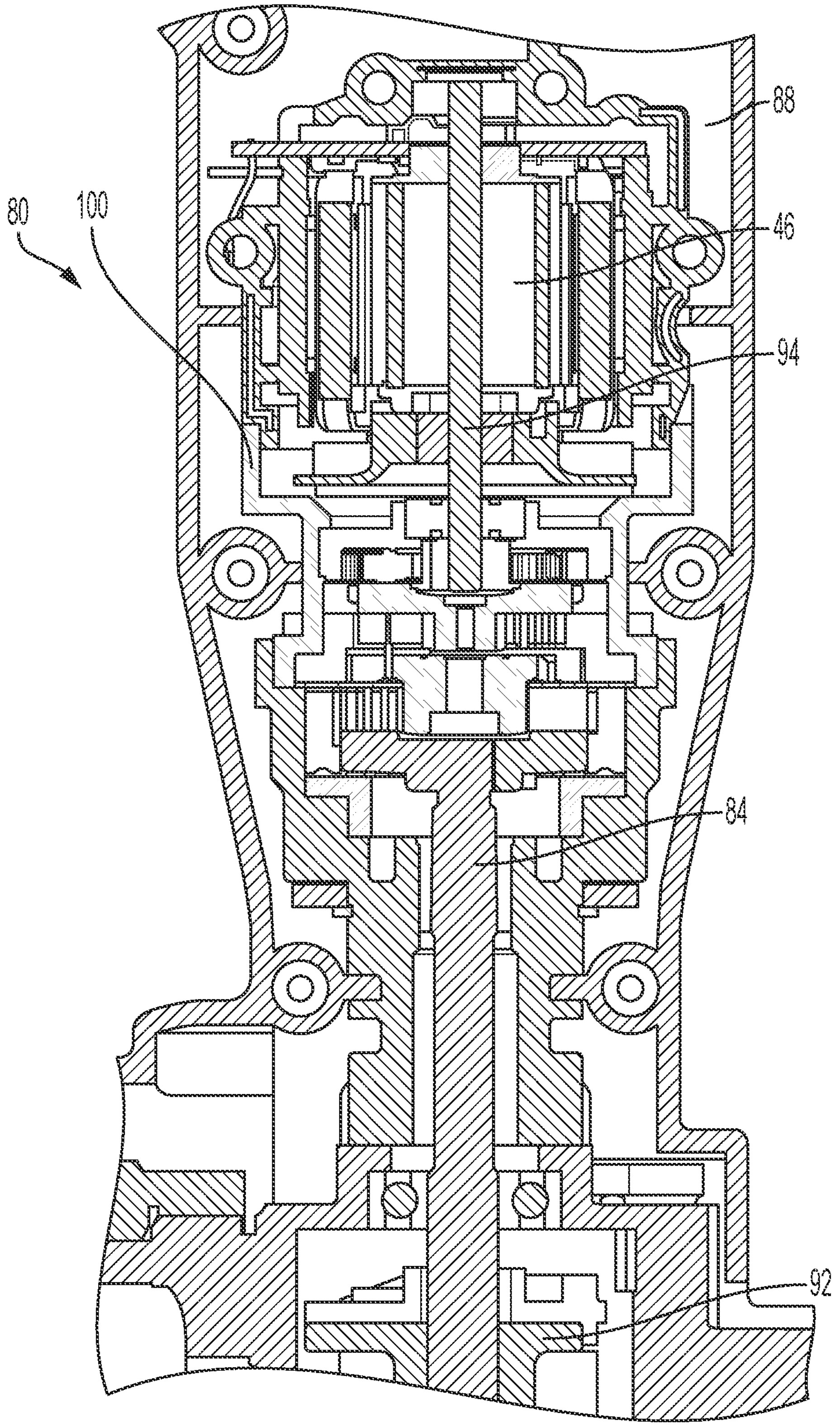
FIG. 3 is a cross-sectional view of the gas spring-powered fastener driver of FIG. 1 taken along line 3-3 in FIG. 1, illustrating a motor and a transmission for providing torque to a lifter.

With reference to FIGS. 1 and 3, the driver 10 includes a housing 64 that has a cylinder support portion 68 in which the storage chamber cylinder 30 is at least partially positioned, and a motor support portion 72 in which the motor 46 and a transmission 80 are at least partially positioned. In the illustrated embodiment, the cylinder support portion 68 is integrally formed with the motor support portion 72 as a single piece (e.g., using a casting or molding process, depending on the material used). The transmission 80 raises the driver blade 26 from the driven position to the ready position. With reference to FIG. 3, the motor 46 is positioned within the transmission housing portion 72 to provide torque to the transmission 80 when activated. A battery pack 76 (FIG. 1) is electrically connectable to the motor 46 for supplying electrical power to the motor 46. In some embodiments, the driver may be powered from an alternative power source such as an AC voltage input (i.e., from a wall outlet), or by an alternative DC voltage input (e.g., an AC/DC converter).

With reference to FIGS. 3, the transmission 80 includes an input 84 (i.e., a motor output shaft) and includes an output shaft 96 that extends to a lifter 92 of the lifter assembly 42, which is operable to move the driver blade 26 from the driven position to the ready position, as explained in greater detail below. In other words, the transmission 80 provides torque to the lifter 92 from the motor 46. The illustrated transmission 80 is coupled to a transmission housing 100. The transmission assembly 80 can take various forms and will not be described in detail. For example, the transmission assembly 80 may be the same as or similar to what is described in U.S. application Ser. No. 16/706,365 (titled "Gas Spring-Powered Fastener Driver"), the contents of which are incorporated by reference in their entirety. With reference to FIG. 2, the driver 10 further includes a lifter housing portion 106 (FIG. 2) positioned adjacent the storage chamber cylinder 30. The lifter housing portion 106 substantially encloses the lifter assembly 42 that lifts the driver blade 26 to the ready position.

With reference to FIG. 2, the fastener driver 10 includes a bumper 112 that is positioned beneath the piston 22 to stop the piston 22 at the driven position (FIG. 6A) and to absorb the impact energy from the piston 22. The bumper 112 is configured to distribute the impact force of the piston 22 uniformly throughout the bumper 112 as the piston 22 is rapidly decelerated upon reaching the driven position (i.e., the bottom dead center position). The bumper 112 is disposed in the cylinder 18 and is clamped into place by the lifter housing portion 106, which is threaded to the bottom end of the cylinder 18. As shown, the bumper 112 is received within a cutout 114 that is formed in the lifter housing portion 106. The cutout 114 coaxially aligns the bumper 112 relative to the driver blade 26.

In one example, and with reference to FIGS. 4 and 5, the fastener driver 10 includes a check valve 116 (or similar valve) that is positioned between the bumper 112 and the outer storage chamber cylinder 30 within a passageway 118. The check valve 116 is responsive to pressure as the piston 22 compresses the bumper 112. More specifically, as the piston 22 is driven from the ready position to the driven position, the piston 22 impacts the bumper 112, which seals against the inner cylinder 18 to create an air reservoir or annular intermediate chamber 120. The intermediate chamber 120 is formed between a bottom portion of the cylinder 18 and the bumper 112 (and in some circumstances, the bumper 112 and the piston 22) when the driver blade 26 approaches the bottom-dead-center position. That is, the intermediate chamber 120 is completely sealed (i.e., not fluidly connected to the outside atmosphere) when the piston 22 impacts the bumper 112. As the piston 22 compresses the bumper 112, the pressure in the intermediate chamber 120 increases and opens the check valve 116. This increased air pressure through the opened check valve 116 adds a small amount of pressurized air to the outer storage chamber cylinder 30, which results in a higher pressure applied to the cylinder 18 that can compensate for potential or actual air pressure losses in the driver 10. As such, an increase in air pressure can be generated using bumper compression that occurs at the end of every firing event of the driver 10. This avoids the need for a separate compressor to be attached to the cylinder 30 for increasing the pressure on the piston 22. In effect, the complementary compression of the bumper 112 and the opening of the check valve 116 forms an onboard air compressor for the fastener driver 10.

By using the repetitive compression of the bumper 112 by the piston 22 to complement the pressure in the storage chamber cylinder 30, a small amount of air pressure (e.g., approximately 0.01-0.015 psi) can be added each time the bumper 112 is compressed by the piston 22. Extrapolating this over 1000 nails fired by the driver 10, this added pressure equates to approximately 10-15 psi, which is 10-15% of the total tank pressure. While the added pressure is relatively small compared to the total tank pressure, the added pressure facilitated by compression of the bumper 112 and the opened check valve 116 is enough to maintain an adequate tank pressure even after pressure losses are accounted for (e.g., due to permeation, minor debris ingress, or mild mechanical wear).

Figure 7:
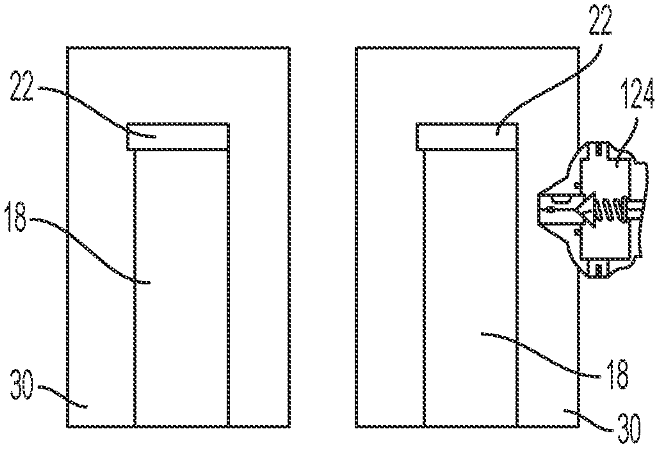
FIG. 7 is a schematic of exemplary pressure relief in the fastener driver.
Figure 8:
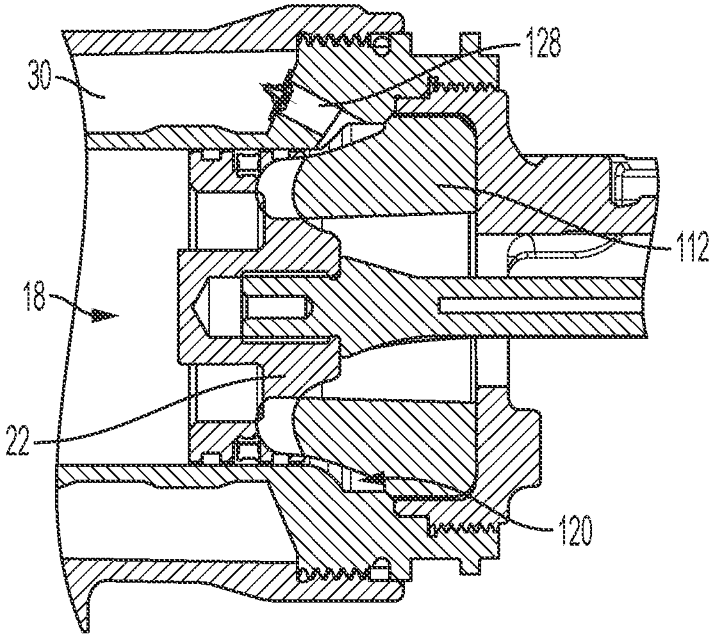
FIG. 8 is an enlarged cross-sectional view of a portion of the fastener driver illustrating a combined pressure-increase and pressure-relief mechanism in a first state.
Figure 9:
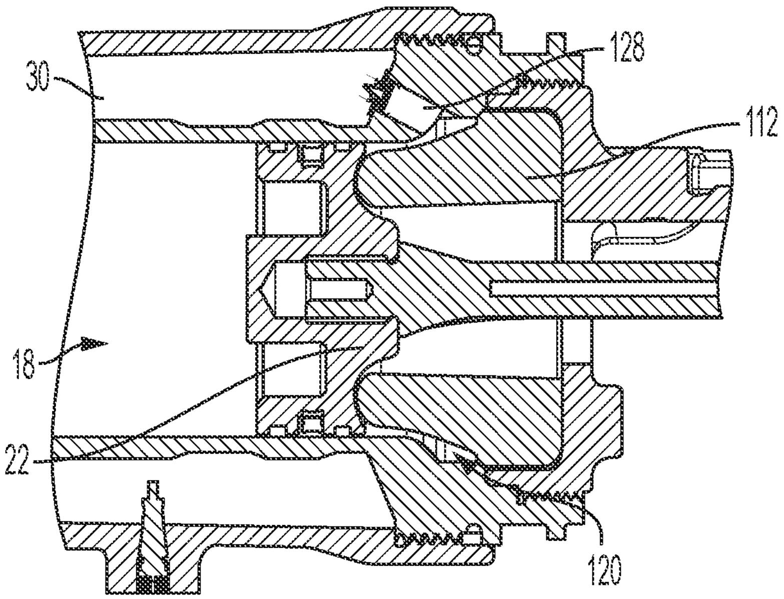
FIG. 9 is another enlarged cross-sectional view of a portion of the fastener driver illustrating a combined pressure-increase and pressure-relief mechanism in a second state.

In some circumstances, operational temperature associated with the fastener driver 10 or ambient temperature, or both, may increase the pressure applied to the piston 22 to an extent that a pressure relief is desirable. In these circumstances, and with reference to FIG. 7, the fastener driver 10 can include a pressure relief valve 124 that opens at a predetermined pressure to vent air when the pressure in the storage chamber cylinder 30 is higher than the pressure needed to correctly seat the fastener while also avoiding having the fastener driver 10 absorb more energy from movement of the piston 22 than is necessary. For example, at high temperatures, the pressure on the piston 22 may increase to an extent where air is vented via the valve 124 to keep the fastener driver 10 within a desired pressure tolerance range. In addition, in low operating temperatures for the fastener driver 10, the onboard compressor defined by the compression of the bumper 112 and opening of the check valve 116 (i.e. leveraging the air reservoir formed by the bumper 112 when the bumper 112 seals against the cylinder 18) assists with repressurizing the cylinder 18 to maintain performance of the fastener driver 10.

It will be appreciated that some embodiments of the fastener driver 10 may include, in combination, the check valve 116 to increase pressure within the storage chamber cylinder 30 and a pressure relief valve 124 that relieves pressure from the storage chamber cylinder 30.

Figure 10:
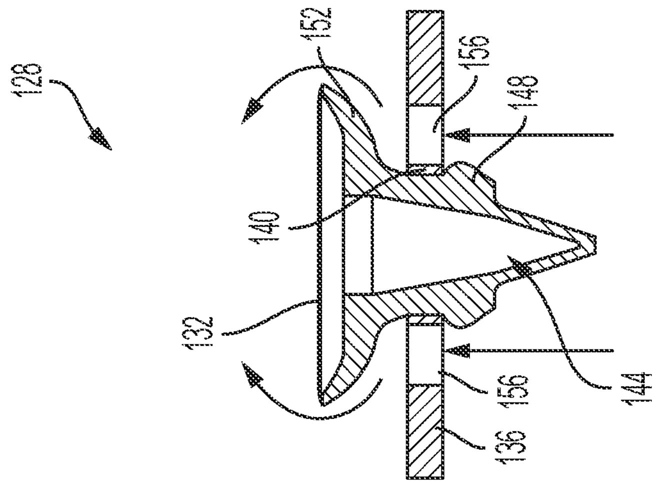
FIG. 10 is a cross-sectional view of the combined pressure-increase and pressure-relief mechanism in the second state.
Figure 11:
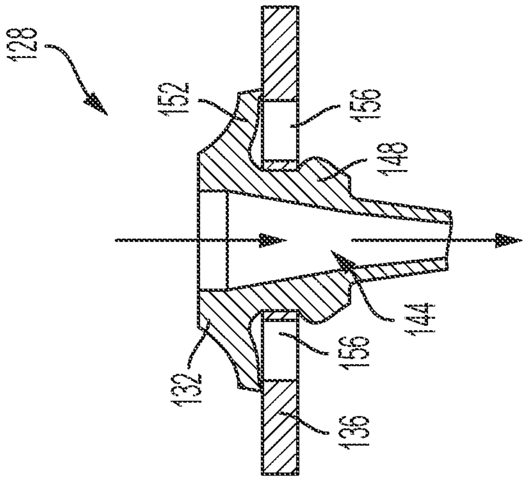
FIG. 11 is a cross-sectional view of the combined pressure-increase and pressure-relief mechanism in the first state.

In another example, and with reference to FIGS. 8-11, the fastener driver 10 may include a combination valve 128 that is positioned between the bumper 112 and the storage chamber cylinder 30 e.g., in the passageway 118 and that combines the functionality of a check valve and a pressure relief valve. An exemplary combination valve 128 is manufactured by Minivalve, Inc., located at 692 Oak Tree Boulevard, Suite 200, Cleveland, OH 44131. In this example, the valve 128 is responsive to pressure as the piston 22 compresses the bumper 112, as well as responsive to the pressure in the storage chamber cylinder 30 such that the valve 128 can increase pressure in the storage chamber cylinder 30 when the pressure is lower than a desired amount. The valve 128 also can decrease or relieve pressure when the pressure in the storage chamber cylinder 30 is above a desired pressure for the piston 22. As shown in FIGS. 10 and 11, the valve 128 includes a pressure release valve 132 and a membrane 136 that has a hole or opening 140 into which the pressure release valve 132 is coupled to or positioned within. The pressure release valve 132 includes a body that defines a tapered passageway 144 and that has an annular shoulder 148 and an annular flange 152. The tapered passageway 144 extends narrower from a side of the pressure release valve 132 that is in communication with the air reservoir 120 toward the storage chamber cylinder 30. The shoulder 148 is engaged with the membrane 136 on a first side within the storage chamber 30 to hold the pressure release valve 132 in place. The flange 152 is engaged with the membrane 136 on a second side opposite the first side and is responsive to pressure within the storage chamber cylinder 30 to relieve pressure in the storage chamber cylinder 30 when the pressure is above a predetermined amount.

The membrane 136 also includes apertures or openings 156 that facilitate pressure relief. The openings 156 are aligned with the flange 152 such that, as shown in FIG. 10, when pressure in the storage chamber cylinder 30 is above a predetermined threshold, the excess pressure flips or inverts the flange 152 to relieve the excess pressure. After the pressure has been relieved, the flange 152 can be designed to return to the state shown. The pressure release valve 132 and the membrane 136 also facilitate increasing pressure within the storage chamber cylinder 30. In particular, and with reference to FIG. 11, when the piston 22 impacts the bumper 112 and generates additional air pressure within the air reservoir 120, the additional high-pressure air is directed through the tapered passageway 144 into the storage chamber cylinder 30 to supplement the pressure in the storage chamber cylinder 30. The tapered passageway 144 assists with providing airflow communication from the air reservoir 120 to the storage chamber cylinder 30 when it is desired to supplement the pressure in the storage chamber cylinder 30, while also ensuring that pressure relief occurs via the openings 156 when the pressure in the storage chamber cylinder 30 is higher than desired (e.g., due to operational temperature, ambient temperature, or both).

Figure 12:
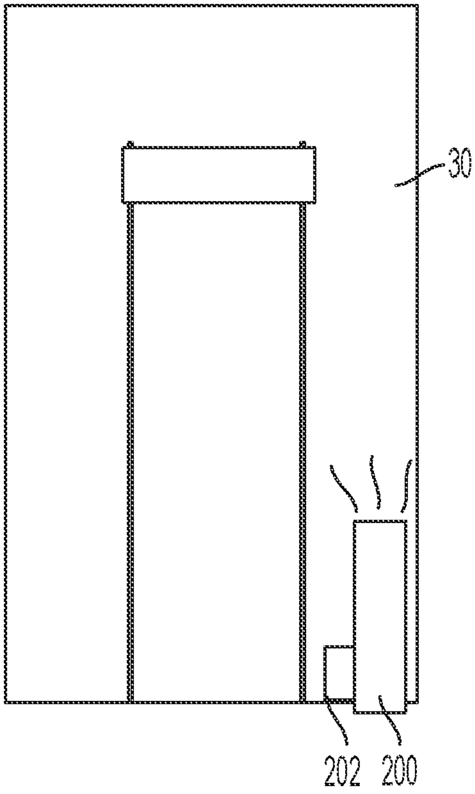
FIG. 12 is a schematic of a portion of a fastener driver including an exemplary glow plug that can be positioned in the outer storage chamber cylinder and that is in an operational state to account for a low operating temperature.
Figure 13:
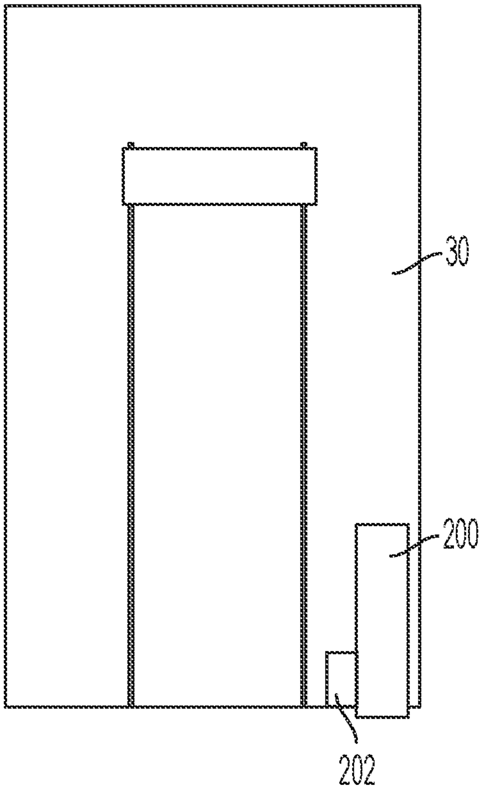
FIG. 13 is a schematic of the portion of the fastener driver of FIG. 12 including the glow plug in a non-operational state due to normal or high operating temperatures.
Figure 14:
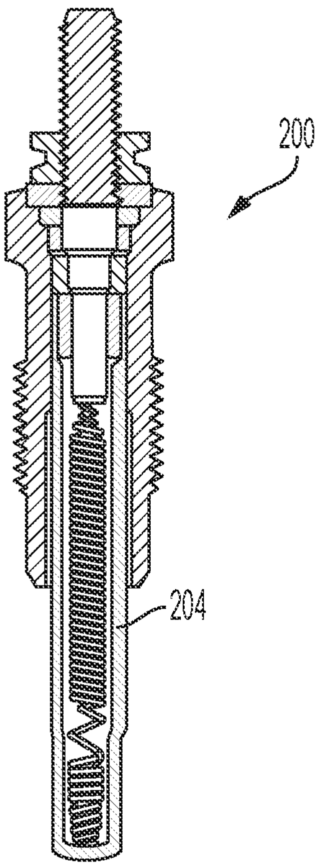
FIG. 14 is a cross-sectional view of the glow plug of FIG. 12.

In another example, and with reference to FIGS. 12-14, the fastener driver 10 includes a glow plug 200 positioned within the storage chamber cylinder 30. As shown in FIGS. 12 and 14, the glow plug 200 includes a sensor 202 that measures the pressure within the storage chamber cylinder 30, and a heating rod 204 that selectively heats air within the storage chamber cylinder 30. The sensor 202 may be a piezoresistive strain gauge pressure sensor or another sensor that can measure pressure. The glow plug 200 heats the air within the storage chamber cylinder 30 via the heating rod 204 based on the pressure measured by the sensor 202.

In use, the glow plug 200 can be used to heat the air within the storage chamber cylinder 30 when the pressure within the storage chamber cylinder 30 falls below a predetermined level. For example, the pressure within storage chamber cylinder 30 may drop as a result of a lower ambient temperature in the external environment. When the sensor 202 detects a decrease in pressure below the predetermined level, the glow plug 200 can be activated to heat the air within the storage chamber cylinder 30 and increase the pressure within the storage chamber cylinder 30 (FIG. 12). With reference to FIG. 13, when the sensor 202 determines that the pressure in the storage chamber cylinder 30 is above the predetermined level (e.g., due to an increase in temperature due to firing the fastener driver 10 or an elevated external ambient temperature), the glow plug is off (or turned off). In other words, the glow plug 200 is solely used to heat the air in the storage chamber cylinder 30 when the pressure within the storage chamber cylinder 30 is low. The storage chamber cylinder 30 may have a lower initial fill pressure than what would normally be used because the glow plug 200 can be implemented to increase the pressure. For example, the storage chamber cylinder 30 may be filled to approximately 80% of a typical initial fill pressure. The glow plug 200 regulates the pressure within the storage chamber cylinder 30 such that the pressure stays within a desired range regardless of the fire rate of the fastener driver 10 or the external ambient temperature.

In another example, and with reference to FIGS. 15-18, the fastener driver 10 includes a tank separator 300 disposed in the storage chamber cylinder 30 between an outer surface 304 of the cylinder 18 and an inner surface 306 of the storage chamber cylinder 30. The illustrated tank separator 300 includes an annular ring 308 that spans the space between the cylinder 18 and the storage chamber cylinder 30, and an O-ring that is coupled to the annular ring 308 at the outer surface 304 of the chamber 30. In some embodiments, the annular ring 308 may be formed from a metal. In other embodiments, the annular ring 308 may be formed from other material (e.g., plastic, composite, etc.). The tank separator 300 is biased by a spring 312 toward the top-dead-center position (i.e., a neutral position of the tank separator 300).

Figure 18:
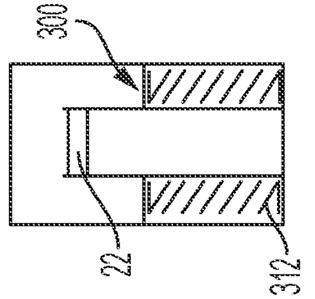
FIG. 18 is a schematic of the tank separator of FIG. 15, illustrating the driver blade in the top-dead-center position with the tank separator in a compressed position.
Figure 17:
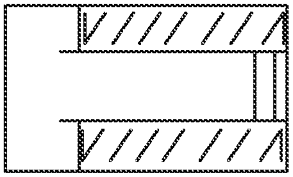
FIG. 17 is a schematic of the tank separator of FIG. 15, illustrating the driver blade in a bottom-dead-center position with the tank separator in the neutral position at a second operating temperature.
Figure 16:
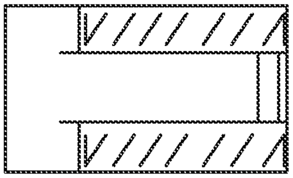
FIG. 16 is a schematic of the tank separator of FIG. 15, illustrating the driver blade in a bottom-dead-center position with the tank separator in the neutral position at a first operating temperature.
Figure 15:
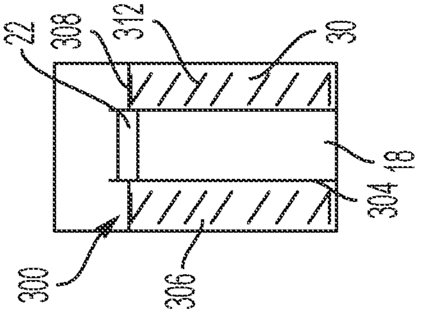
FIG. 15 is a schematic of a portion of a fastener driver including an exemplary tank separator, illustrating a driver blade in a top-dead-center position with the tank separator in a neutral position.

As the temperature within the cylinder 18 and the storage chamber cylinder 30 increases, the pressure within the cylinder 18 and the storage chamber cylinder 30 also increases. For example, and with reference to FIGS. 15-17, the temperature within the cylinder 18 and the storage chamber cylinder 30 may increase as a result of firing the piston 22. As the piston 22 moves downward, the tank separator 300 remains in the neutral position. FIG. 18 illustrates that, when the pressure within the cylinder 18 and the storage chamber cylinder 30 reaches a predetermined level due to added heat, the tank separator 300 is biased toward bottom-dead-center against the mechanical bias of the spring 312. This movement of the tank separator 300 increases the volume of the storage chamber cylinder 30 to regulate the pressure within the storage chamber cylinder 30. In other words, while the temperature within the storage chamber cylinder 30 increases, the pressure within the storage chamber cylinder 30 remains substantially constant (e.g., 164 psi) due to the increased volume of the storage chamber cylinder 30.

Figure 19A:
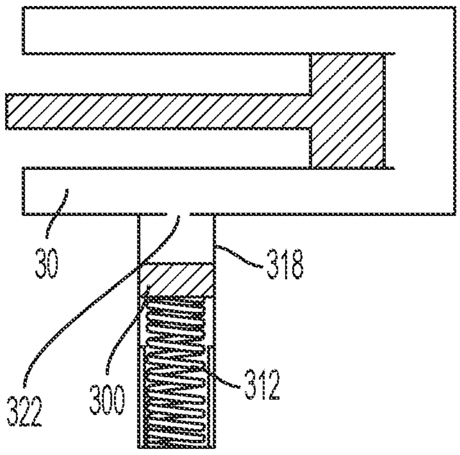
FIG. 19A is a schematic of another exemplary tank separator for a fastener driver.
Figure 19B:
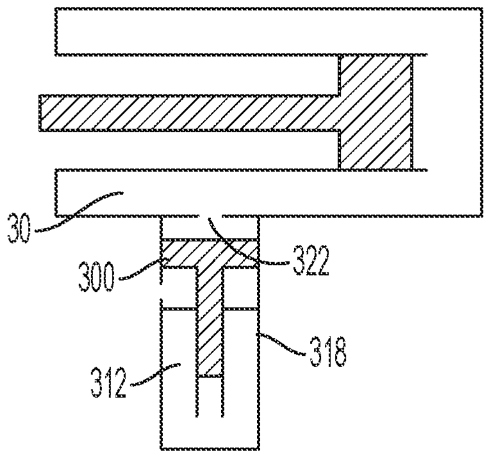
FIG. 19B is a schematic of another exemplary tank separator for a fastener driver.

In some embodiments, the tank separator 300 may take the form of a gas spring that is coupled to the storage chamber cylinder 30. In one example, and with reference to FIGS. 19A and 19B, the spring 312 may be located in a compartment 318 that protrudes outwardly from the storage chamber cylinder 30. In some embodiments, the spring 312 may be a mechanical spring (FIG. 19A). In other embodiments, the spring 312 may be a gas spring (FIG. 19B). The compartment 318 is fluidly coupled to the storage chamber cylinder 30 via an opening 322. The spring 312 biases the tank separator 300 toward the storage chamber cylinder 30. As the pressure within the storage chamber cylinder 30 increases, the pressure biases the tank separator 300 away from the storage chamber cylinder 30, compressing the spring 312. Movement of the tank separator 300 increases the volume of the storage chamber cylinder 30, which regulates the pressure within the storage chamber cylinder 30 to maintain a substantially constant pressure.

Figure 20:
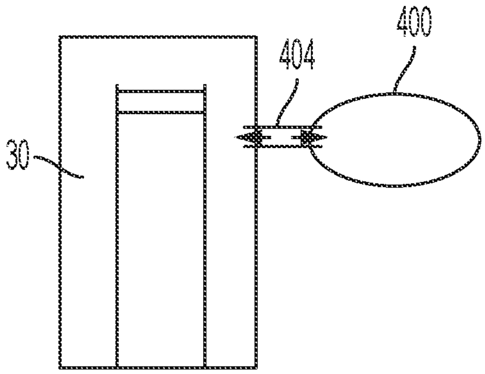
FIG. 20 is a schematic of an exemplary bladder coupled to the outer storage chamber of a fastener driver, illustrating the bladder in a neutral position.
Figure 21:
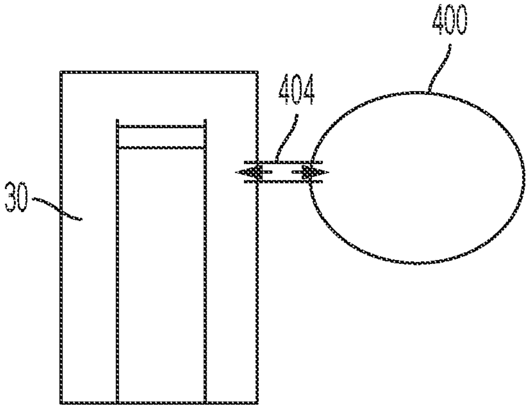
FIG. 21 is a schematic of the bladder of FIG. 20, illustrating the bladder in an expanded position.

In another example, and with reference to FIGS. 20 and 21, the fastener driver 10 includes a bladder 400 that is fluidly coupled to the storage chamber cylinder 30. The bladder 400 may be a rubber bladder, or the bladder 400 may include metal springs that act on a pressurized bladder portion of the bladder 400. The bladder 400 is coupled to the storage chamber cylinder 30 via a conduit 404. In some embodiments, the bladder 400 may be coupled to the storage chamber cylinder 30 via other connections. The bladder 400 varies from a neutral position (FIG. 20) to an expanded position (FIG. 21) to maintain substantially constant pressure (e.g., 164 psi) in the storage chamber cylinder 30. In the neutral position, the bladder 400 has a first volume, and in the expanded position, the bladder 400 has a second, larger volume. In use, as the temperature within the storage chamber cylinder 30 increases, the pressure within the storage chamber cylinder 30 also increases. The increased air enters the bladder 400 via the conduit 404, expanding the bladder 400 to the expanded position (FIG. 21). Expansion of the bladder 400 increases the volume of the storage chamber cylinder 30 to account for the increase in pressure. The bladder 400 allows movement of air to and from the storage chamber cylinder 30 so that the pressure within the storage chamber cylinder 30 to remains substantially constant regardless of the temperature within the storage chamber cylinder 30.

Figure 22:
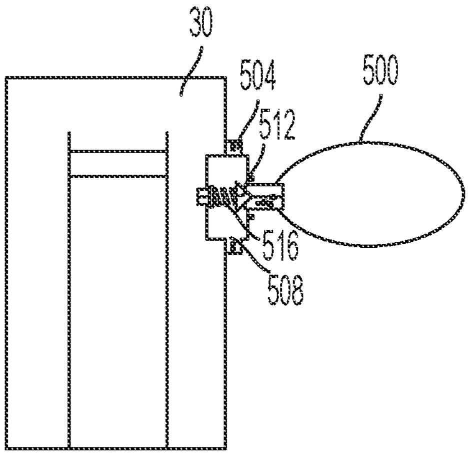
FIG. 22 is a schematic of an exemplary auxiliary tank coupled to the outer storage chamber of a fastener driver, illustrating a valve of the auxiliary tank in a closed position.
Figure 23:
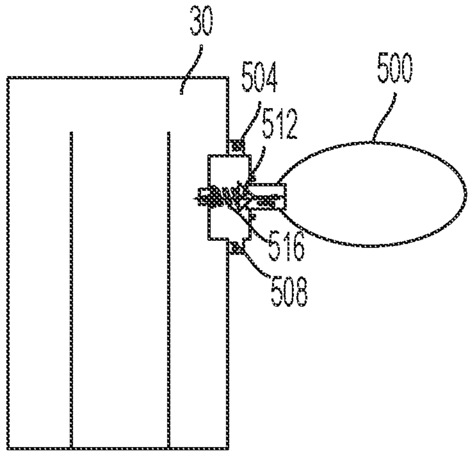
FIG. 23 is a schematic of the auxiliary tank of FIG. 22, illustrating the valve of the auxiliary tank in an open position.

In another example, and with reference to FIGS. 22 and 23, the fastener driver 10 includes an auxiliary tank 500 that is fluidly coupled to the storage chamber cylinder 30 via a pressure relief valve 504. The pressure relief valve 504 includes a valve housing 508, a plunger 512 disposed in the valve housing 508, and a spring 516 that biases the plunger 512 toward the auxiliary tank 500. In some embodiments, pressure relief valve 504 is a one-way valve such that air may solely travel from the auxiliary tank 500 to the storage chamber cylinder 30. In other embodiments, the pressure relief valve 504 may be a two-way valve. The storage chamber cylinder 30 and the auxiliary tank 500 are filled with pressurized air to respective predetermined pressures (e.g., 164 psi and 500 psi, respectively). The respective pressures in the storage chamber cylinder 30 and in the auxiliary tank 500 may vary. The auxiliary tank 500 is filled to a higher pressure than the storage chamber cylinder 30 to accommodate a potential drop in pressure within the storage chamber cylinder 30. When the pressure drops in the storage chamber cylinder 30 (e.g., due to a leak or a drop in operating temperature caused by low ambient temperature), the pressure relief valve 504 opens to allow air from the auxiliary tank 500 to repressurize the storage chamber cylinder 30. More specifically, the spring 516 and the air within the storage chamber cylinder 30 bias the plunger 512 toward a closed position, against the bias of the air within the auxiliary tank 500. When the pressure within the storage chamber cylinder 30 drops, so does the force acting on the plunger 512. This drop in force allows the air within the auxiliary tank 504 to bias the plunger 512 to an open position, allowing the air from the auxiliary tank 504 to enter the storage chamber cylinder 30, repressurizing the storage chamber cylinder 30. The pressure relief valve 504 may repressurize the storage chamber cylinder 30 to a minimum pressure. In some embodiments, the minimum pressure may be approximately 140 psi. In other embodiments, the minimum pressure may be higher or lower than 140 psi.

Figure 24:
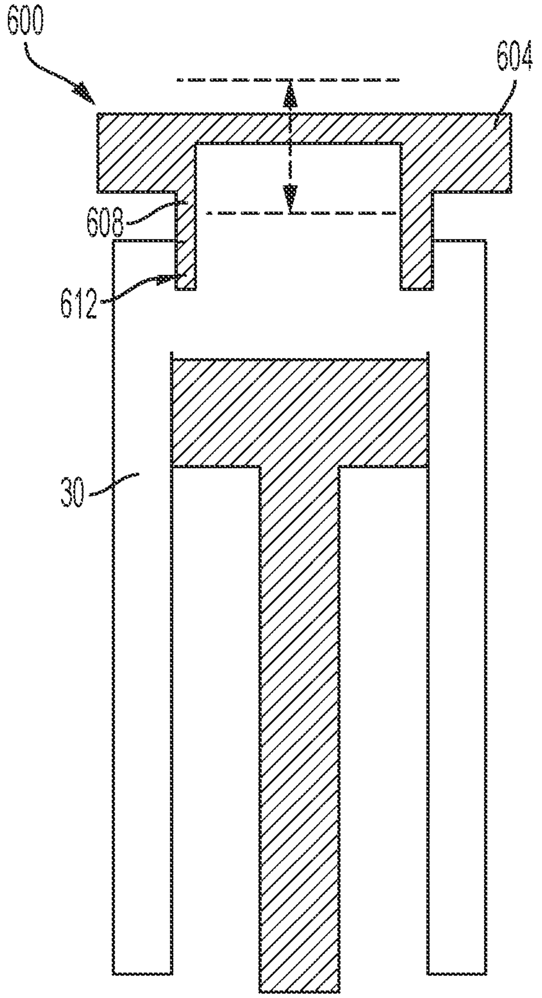
FIG. 24 is a schematic of an exemplary manual pressure adjuster coupled to the outer storage chamber of a fastener driver.

In another example, and with reference to FIG. 24, the fastener driver 10 includes a manual pressure adjuster 600 located at an end of the storage chamber cylinder 30. In other embodiments, the location of the manual pressure adjuster 600 may differ. The manual pressure adjuster 600 has an adjustable portion 604 that is coupled to the storage chamber cylinder 30 (e.g., by threaded connection). A user may engage the adjustable portion 604 to alter the position of the adjuster 600 relative to the storage chamber cylinder 30. Altering the position of the adjustable portion 604 changes the volume of the storage chamber cylinder 30 so that the pressure within the storage chamber cylinder 30 can be set to or maintained at a desired level (e.g., 164 psi). For example, rotating or otherwise moving the adjustable portion 604 a small amount marginally changes the volume of (and therefore the pressure in) the storage chamber cylinder 30, whereas rotating or moving the adjustable portion 604 a relatively large amount changes the volume of (and therefore the pressure in) the storage chamber cylinder 30 a correspondingly large amount. The adjuster 600 can be used to maintain the pressure substantially constant within the storage chamber cylinder 30, or to restore pressure that has been lost. For example, the volume within the storage chamber cylinder 30 can be increased by rotating the adjustable portion 604 outward (upward in FIG. 24) to account for higher temperatures that increase the pressure in the storage chamber cylinder 30. The temperature affecting the pressure within the storage chamber cylinder 30 may be high as a result of firing the fastener driver 10 or a high ambient temperature.

Figure 25:
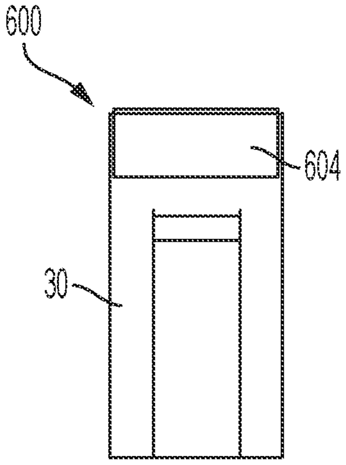
FIG. 25 is a schematic of another exemplary manual pressure adjuster coupled to the outer storage chamber of a fastener driver, illustrating the manual pressure adjuster in a first or pressurized position.
Figure 26:
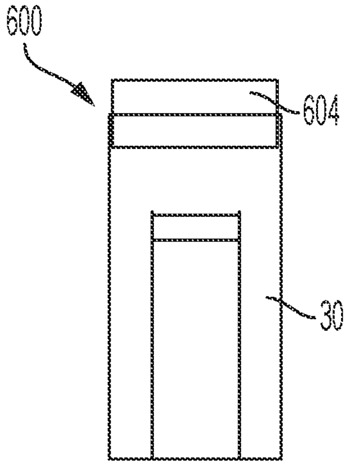
FIG. 26 is a schematic of the manual pressure adjuster of FIG. 25, illustrating the manual pressure adjuster in a neutral position.
Figure 27:
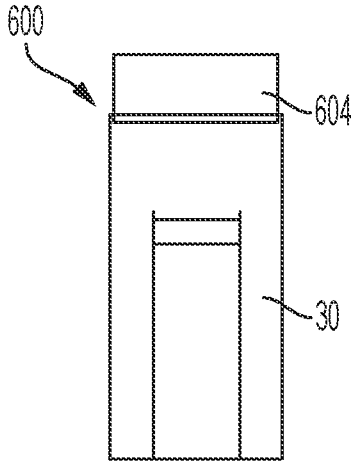
FIG. 27 is a schematic of the manual pressure adjuster of FIG. 25, illustrating the manual pressure adjuster in a second or depressurized position.

The adjuster 600 may take different forms. For example, and with reference to FIGS. 25-27, the adjuster 600 may be movable between a plurality of predetermined positions. For example, the adjustable portion 604 may be movable between a neutral position (FIG. 26), a first or pressurized position (FIG. 25), and a second or depressurized position (FIG. 27). In other embodiments, the adjustable portion 604 may be movable between more than three positions or fewer than three positions. Each of the first and second positions alters the volume of the storage chamber cylinder 30 relative to the neutral position. For example, the second position increases the volume of the storage chamber cylinder 30 (FIG. 27), whereas the first position decreases the volume of the storage chamber cylinder 30 (FIG. 25). The neutral position maintains the volume of the storage chamber cylinder 30 (FIG. 26). The adjuster 600 may include one or more detents 608 that interact with corresponding protrusions 612 in the storage chamber cylinder 30 (or vice versa) to hold the adjustable portion 604 at each position, as shown in FIG. 24. In other embodiments, the adjustable portion 604 may be held to the storage chamber cylinder 30 in other ways.

In use, the user may move the adjustable portion 604 to vary the pressure within the storage chamber cylinder 30. The storage chamber cylinder 30 is filled with compressed air to a predetermined pressure when the adjustable portion 604 is in the neutral position. When the pressure within the storage chamber cylinder 30 is low, the user can move the adjustable portion 604 to the first position (FIG. 25), which decreases the volume of the storage chamber cylinder 30 and increases the pressure within the storage chamber cylinder 30. When the pressure within the storage chamber cylinder 30 is high, the user can move the adjustable portion 604 to the second position (FIG. 27), which increases the volume for the storage chamber cylinder 30 and decreases the pressure within the storage chamber cylinder 30.

In some embodiments, the manual pressure adjuster 600 may include an indicator 616, as shown in FIG. 1. The indicator 616 can be positioned on an exterior surface of the fastener driver 10 such that the indicator 616 is visible to the user. The indicator 616 may indicate to the user that moving the adjustable portion 604 to the first position provides a deeper seating of the fastener in the workpiece and moving the adjustable portion 604 to the second position provides a shallower seating of the fastener in the workpiece. The seating of the fastener is influenced by the pressure of the air within the storage chamber cylinder 30. The indicator 616 may additionally or alternatively indicate to the user that the pressure within the storage chamber cylinder 30 is within a predetermined range. In some embodiments, a separate indicator may indicate the pressure within the storage chamber cylinder 30. In other embodiments, the indicator 616 may solely indicate the seating of the fastener. In other embodiments, the indicator 616 may solely indicate the pressure within the storage chamber cylinder 30.

Figures 28, 29:
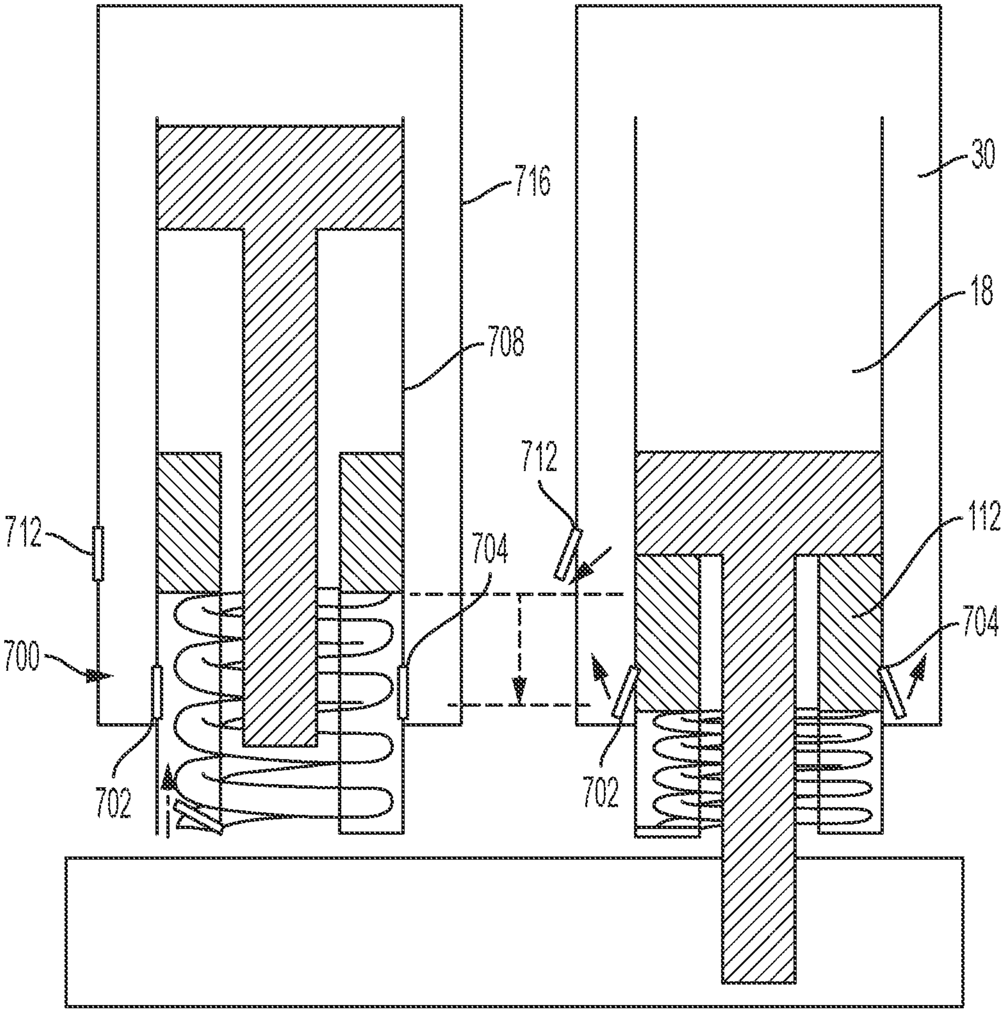
FIG. 28 is a schematic of a portion of a fastener driver including an exemplary pump in the fastener driver, illustrating the pump in an extended or primed position.
FIG. 29 is a schematic of the exemplary pump of FIG. 28, illustrating the pump in a retracted or pump position.

In another example, and with reference to FIGS. 28 and 29, the fastener driver 10 includes a pressure regulating system 700. The pressure regulating system 700 includes first and second check valves 702, 704 in a wall 708 of the cylinder 18 beneath the bumper 112. When open, the first and second check valves 702, 704 fluidly couple the cylinder 18 to the storage chamber cylinder 30. The pressure regulating system 700 additionally includes a third check valve 712 that is disposed on a wall 716 of the storage chamber cylinder 30. When open, the third check valve 712 fluidly couples the storage chamber cylinder 30 to external atmosphere.

In use, the temperature within the cylinder 18 and the storage chamber cylinder 30 increases when the piston 22 impacts the bumper 122. This increase in temperature increases the pressure within the cylinder 18. When the pressure within the cylinder 18 reaches a predetermined level, the first and second check valves 702, 704 open to allow pressurized air to enter the storage chamber cylinder 30. The flow of pressurized air into the storage chamber cylinder 30 increases the pressure in the storage chamber cylinder 30. When the pressure in the storage chamber cylinder 30 increases beyond a predetermined level, the third check valve 712 opens to the external environment to depressurize the storage chamber cylinder 30 at least partially. As such, the pressure within the storage chamber cylinder 30 is regulated so that the pressure does not exceed a predetermined level. Bleeding the air from the storage chamber cylinder 30 is advantageous in situations when the fastener driver 10 has a high fire rate, when the external ambient temperature is high, or when both factors are present.

Figure 30:
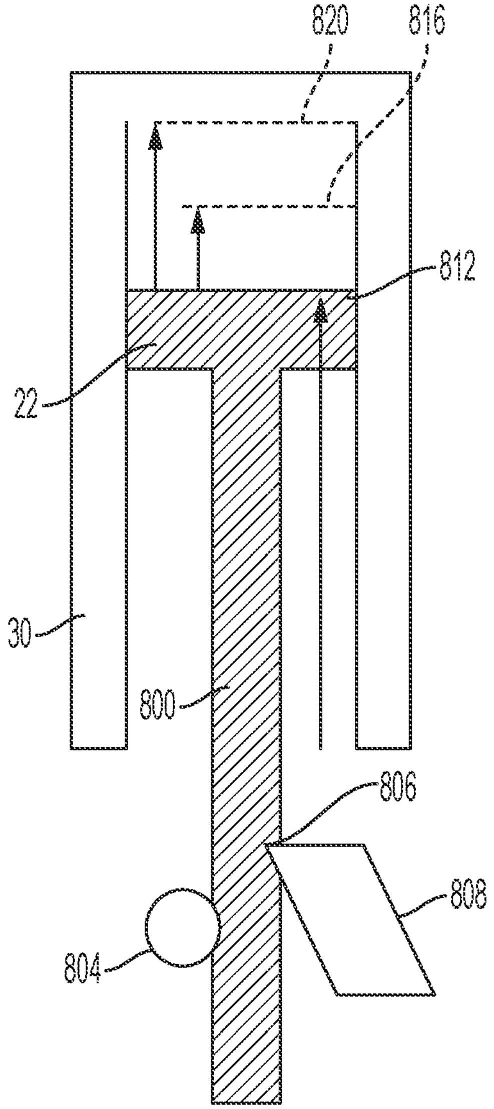
FIG. 30 is a schematic of a portion of a fastener driver including an exemplary driver blade that can be retracted different distances into the fastener driver.

In another example, and with reference to FIG. 30, the fastener driver 10 includes a driver blade 800 that can be retracted farther than existing driver blades to change the pressure in the storage chamber cylinder 30 that impacts the piston on subsequent strokes. The increased retraction may require an increase in tool height (e.g., approximately 1-2 inches). In this embodiment, the fastener driver 10 includes a lifter 804 that is smaller than a lifter in the lifter assembly 42. The smaller lifter 804 rotates more than a larger lifter to allow incremental adjustment to the pressure within the storage chamber cylinder 30. In some embodiments, the lifter 804 has a diameter of approximately 0.15 inches. In some embodiments, the lifter 804 turns between 16 and 18 times to move the piston 22 from the bottom-dead-center position to the top-dead-center position. By rotating the lifter 804 additional revolutions, the distance between top-dead-center and bottom-dead-center increases, which allows the piston 22 to compress the pressurized air within the storage chamber cylinder 30 to a higher pressure when firing. In this example, the storage chamber cylinder 30 initially may be filled to a lower pressure because the piston 22 compresses the air to a higher pressure. For example, in some embodiments the initial fill pressure of the storage chamber cylinder 30 can be 80% of the normal fill pressure.

Additionally, the driver blade 800 includes multiple notches 806 (only one of which is shown in FIG. 30) that interact with a pawl 808 to hold the driver blade 800 in different positions depending on how far the driver blade 800 is lifted by the lifter 804. For example, the driver blade 800 may be held in a low-power position 812 (a first top-dead-center position), a medium-power position 816 (a second top-dead-center position), and a high-power position 820 (a third top-dead-center position). In the low-power position 812 of the illustrated driver blade 800, the lifter 804 rotates 16 times from the bottom-dead-center position. In the medium-power position 816, the lifter 804 rotates 17 times from the bottom-dead-center position. In the high-power position 820, the lifter 804 rotates 18 times from the bottom-dead-center position.

Figure 31:
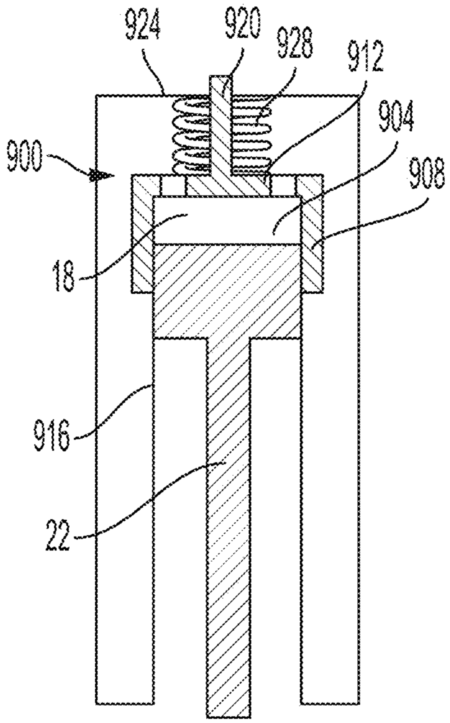
FIG. 31 is a schematic of a portion of a fastener driver including an exemplary pressure-controlled valve.

In another example, and with reference to FIG. 31, the fastener driver 10 includes a valve 900 that is disposed in the storage chamber cylinder 30. The illustrated valve 900 is positioned at an end 904 of the cylinder 18 such that a sleeve 908 extending from a body 912 of the valve 900 engages outer surfaces 916 of the cylinder 18. The valve 900 includes a leg 920 that extends from the body 912 of the valve 900 through an end 924 of the storage chamber cylinder 30 such that the leg 920 is exposed to the external environment. A spring 928 is positioned around the leg 920 to bias the body 912 toward the cylinder 18. In use, an increased pressure within the cylinder 18 pushes the valve 900 toward the end 924 of the storage chamber cylinder 30, compressing the spring 928. Movement of the valve 900 in this direction (upward in FIG. 31) reduces the air pressure applied to the piston 22 from the storage chamber cylinder 30 by decreasing the flow rate of air toward the piston 22. As the pressure increases or decreases, the sleeve 908 moves in response to adjust the flow rate of air acting on the piston 22. After the pressure normalizes, the spring 928 biases the sleeve 908 to the nominal position toward the piston 22. The preload on the spring 928 may be adjusted to change the power output of the driver blade.

Figure 32:
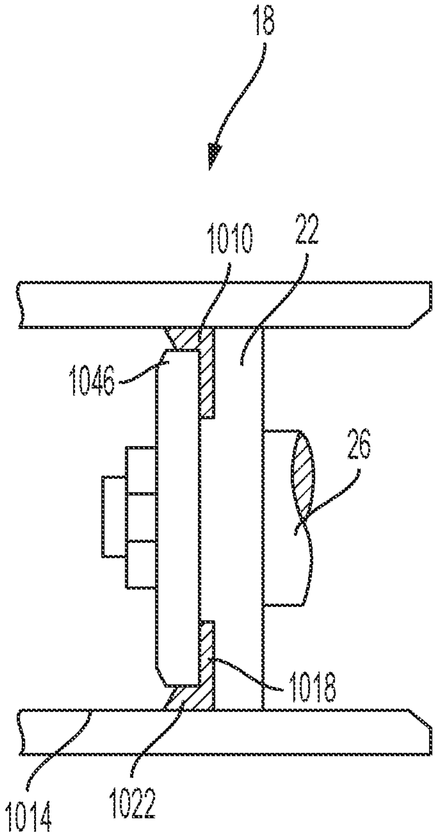
FIG. 32 is a schematic of a portion of a fastener driver including an exemplary sealing member.
Figure 33:
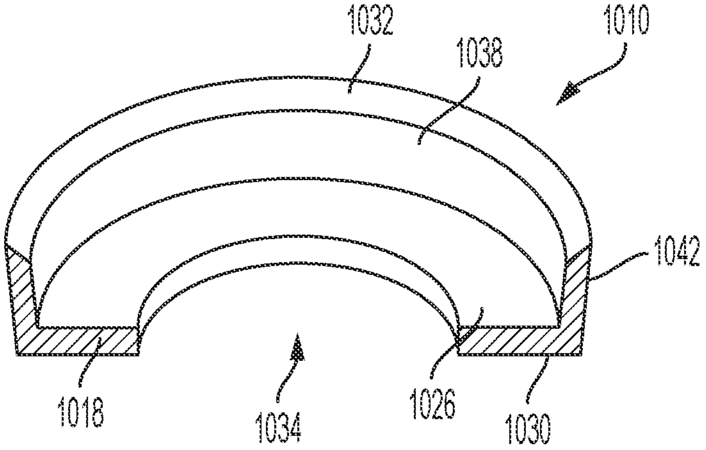
FIG. 33 is a schematic of the sealing member of FIG. 32.

In another example, and with reference to FIGS. 32 and 33, the fastener driver 10 includes a sealing member 1010 that is disposed between the piston 22 and the cylinder 18. The sealing member 1010 seals an annular space between the piston 22 and the cylinder 18 such that compressed air does not escape through the annular space. In other words, the sealing member 1010 prevents compressed air from escaping between the piston 22 and an inner wall 1014 of the cylinder 18 as the piston 22 moves between the top-dead-center position and the bottom-dead-center position.

The check valve 116 may be included in the present embodiment, as shown in FIG. 5. The check valve 116 is responsive to pressure as the piston 22 moves from top-dead-center to bottom-dead-center. More specifically, as the piston 22 is driven from the ready position to the driven position, the sealing member 1010 prevents compressed air from escaping from the intermediate chamber 120. As pressure within the intermediate chamber 120 builds, the check valve 116 is opened, allowing compressed air to flow from the intermediate chamber 120 into the outer storage chamber cylinder 30, repressurizing the outer storage chamber cylinder 30. In other embodiments, the fastener driver 10 may not include the check valve 116.

The sealing member 1010 includes a ring 1018 and a wall 1022 integrally formed with the ring 1018. The ring 1018 includes a first face 1026 and a second face 1030 that is parallel with the first face 1026. The ring 1018 additionally includes a circular cutout 1034 positioned at a center of the ring 1018. The wall 1022 extends outward from an edge of the ring 1018 such that inner and outer faces 1038, 1042 of the wall 1022 are at obtuse angles relative to the first and second faces 1026, 1030 of the ring 1018. For example, the outer faces 1038, 1042 may be at a 95-degree angle, a 100-degree angle, or a similar angle relative to the first and second faces 1026, 1030 of the ring 1018. In other embodiments, the outer faces 1038, 1042 may be at an angle equal to or less than 90 degrees relative to the first and second faces 1026, 1030 of the ring 1018. The wall 1022 is continuous along the edge of the ring 1018 such that the wall 1022 also forms an annular ring. An edge of the wall 1022 is chamfered such that the inner face 1038 has a length or height that is shorter than a length or height of the outer face 1042. When positioned within the fastener driver 10, the ring 1018 extends inward into a space formed in the piston 22, and the wall 1022 is positioned along a surface 1046 of the piston 22. The inner face 1038 of the wall 1022 is in contact with the surface 1046 of the piston 22 while the outer face 1042 of the wall 1022 is in contact with the inner wall 1014 of the cylinder 18. The sealing member 1010 may be formed of a rubber material, a silicone material, or the like. The sealing member 1010 acts as a single-acting seal. In other words, the sealing member 1010 holds pressure in only one direction.

Figure 34:
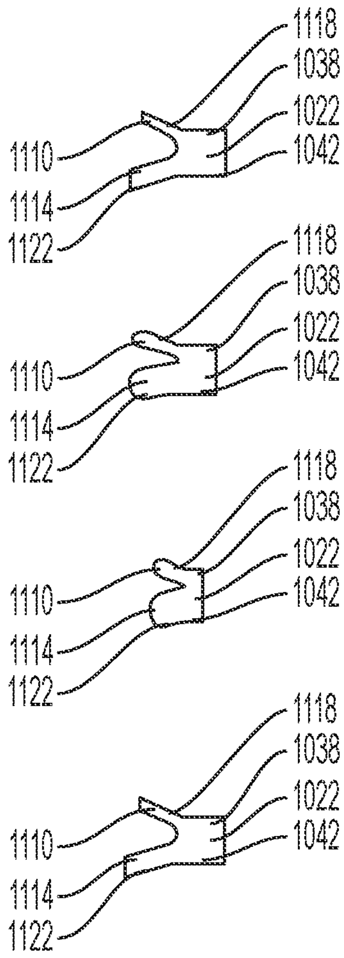
FIG. 34 is a schematic of a sealing member of a fastener driver.

In another example, and with reference to FIG. 34, the sealing member 1010 may include first and second arms 1110, 1114 which extend from the edge of the wall 1022. In other words, the first and second arms 1110, 1114 replace the chamfer shown in FIG. 33. The first arm 1110 includes a first face 1118 that is continuous with the inner face 1038. The second arm 1114 includes a second face 1122 that is continuous with the outer face 1042. The first and second arms 1110, 1114 are angled away from each other such that the first face 1110 is angled relative to the inner face 1038 and the second face 1114 is angled relative to the outer face 1042. The second arm 1114 defines a length that is greater than a length of the first arm 1110. The second arm 1114 additionally defines a width that is greater than a width of the first arm 1110. In other embodiments, the length and/or the width of the second arm 1114 may be less than or the same as the length and/or the width of the first arm 1110. Cross sectional shapes of the arms may be rectangular, circular, oblong, or the like. When positioned within the fastener driver 10, the first face 1118 of the first arm 1110 is in contact with the surface 1046 of the piston 22 while the second face 1122 of the second arm 1114 is in contact with the inner wall 1014 of the cylinder 18.

Figure 35:
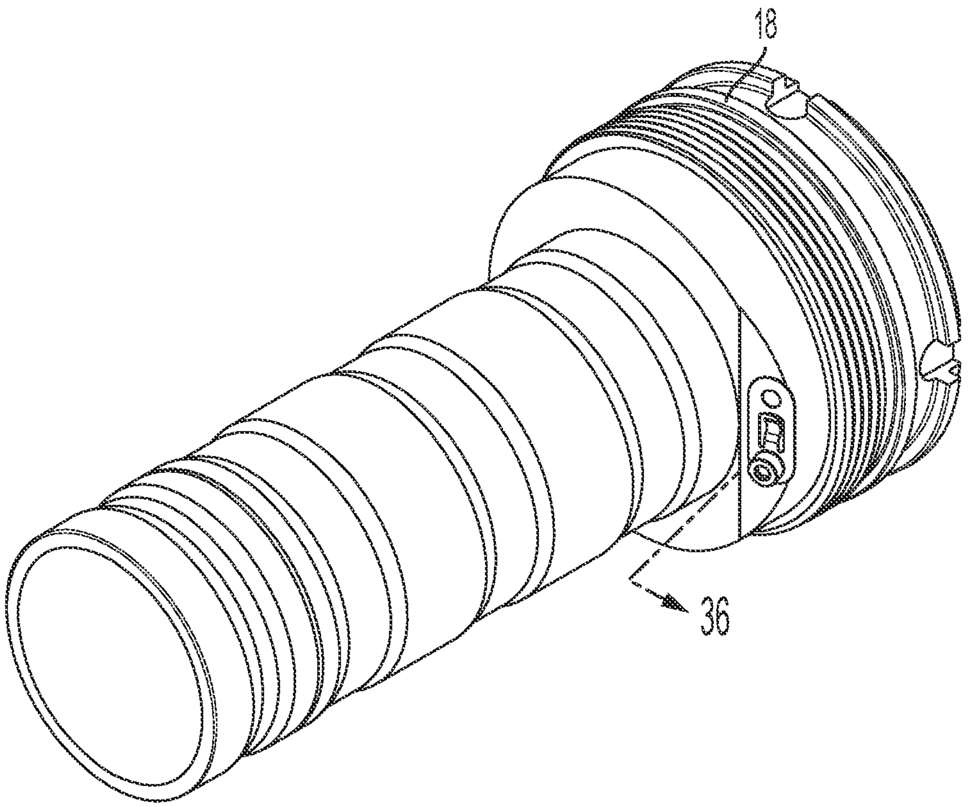
FIG. 35 is a perspective view of another exemplary cylinder.
Figure 36:
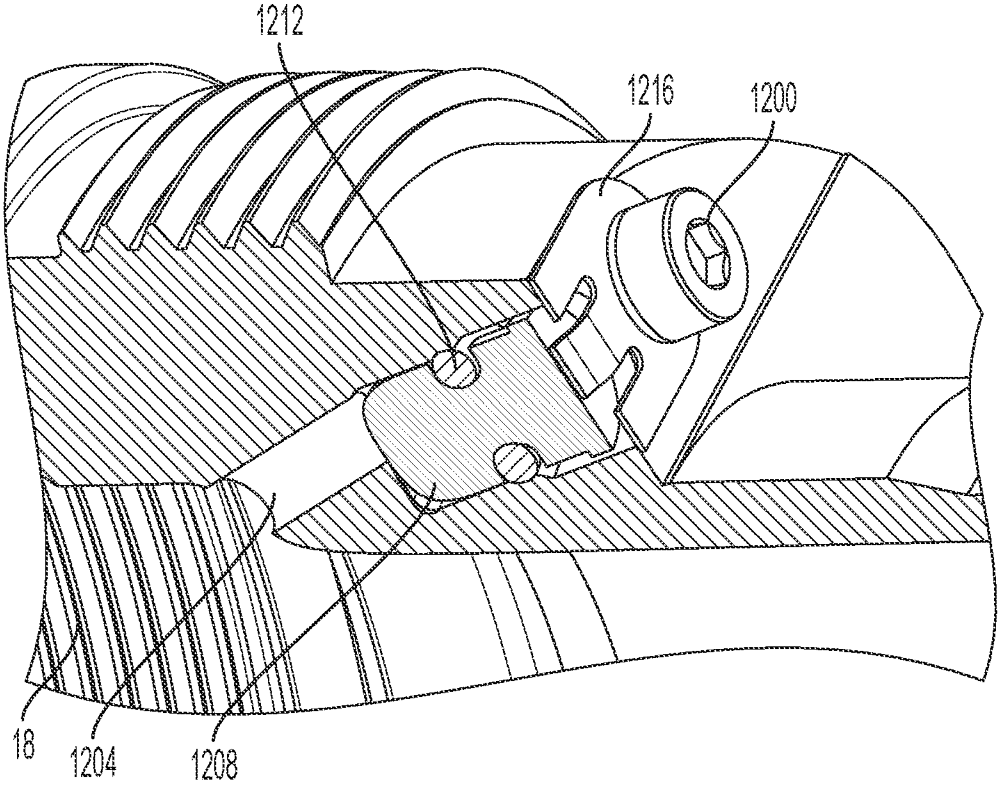
FIG. 36 is a cross-sectional view of the cylinder of FIG. 35, showing a sealing member.

In another example, and with reference to FIGS. 35 and 36, the fastener driver 10 includes a pressure release mechanism 1200 disposed between the cylinder 18 and the storage chamber cylinder 30. The cylinder 18 includes an aperture 1204 extending between the cylinder 18 and the storage chamber cylinder 30 such that the cylinder 18 and the storage chamber cylinder 30 are fluidly connected. The pressure release mechanism 1200 is positioned proximate the aperture 1204 to seal the aperture 1204. In other words, the pressure release mechanism 1200 seals the aperture 1204 such that the cylinder 18 and the storage chamber cylinder 30 are fluidly distinct. In some embodiments, the pressure release mechanism 1200 is a slidable plug 1208 with an O-ring 1212 disposed on an exterior of the slidable plug 1208. A spring 1216 is disposed on an end of the slidable plug 1208 such that the slidable plug 1208 is biased toward the aperture 1204. When the pressure within the cylinder 18 reaches a predetermined pressure, the slidable plug 1208 is pushed away from the cylinder 18, compressing the spring 1216. Movement of the slidable plug 1208 allows air to escape from the cylinder 18 and into the storage chamber cylinder 30.

Figure 37:
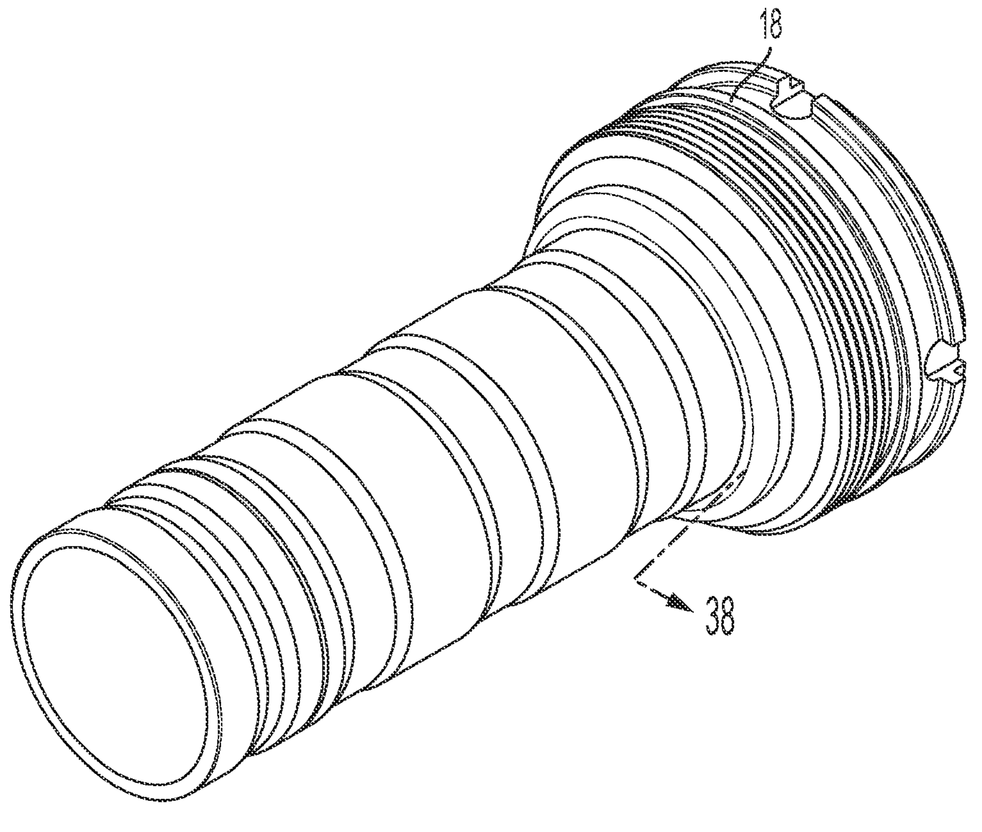
FIG. 37 is a perspective view of another exemplary cylinder.
Figure 38:
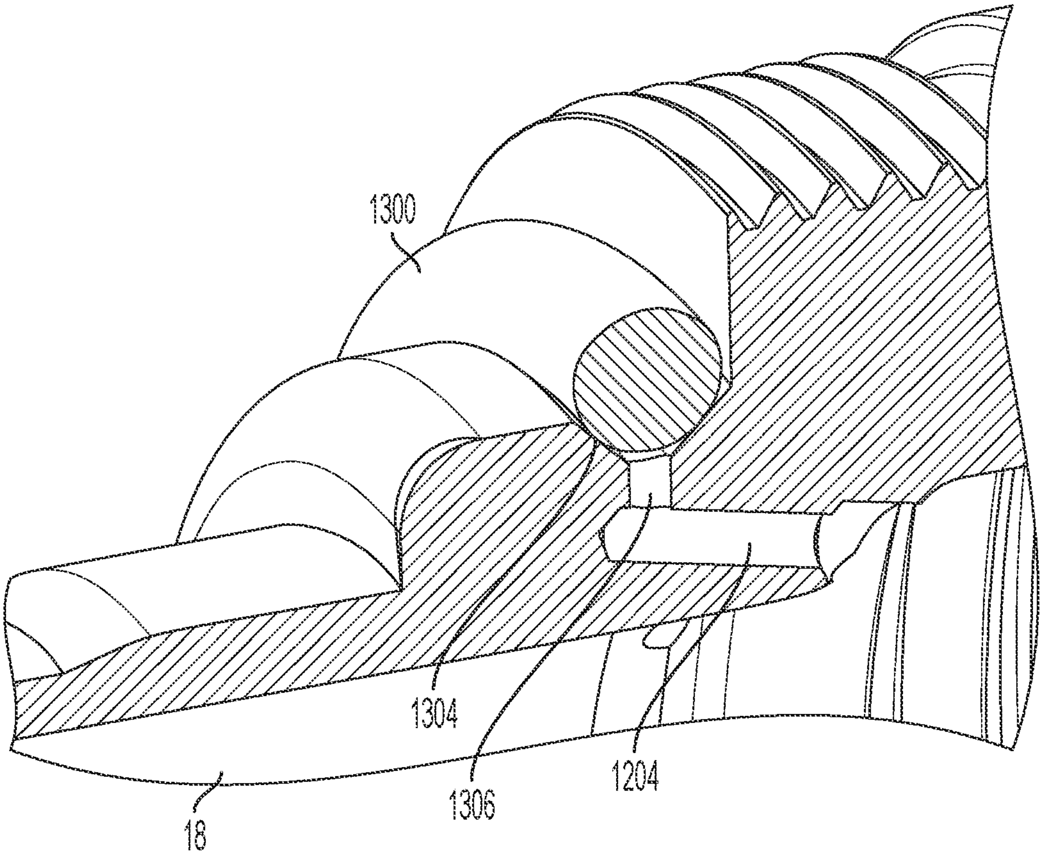
FIG. 38 is a cross-sectional view of the cylinder of FIG. 37, showing a sealing member.
Figure 39:
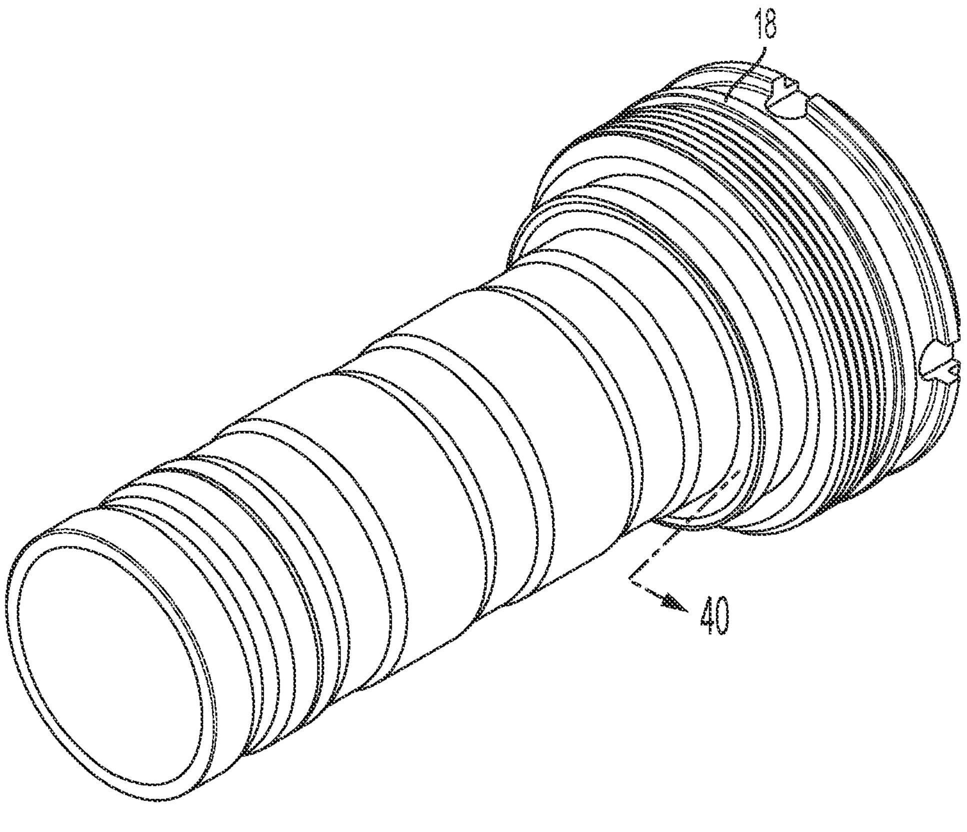
FIG. 39 is a perspective view of another exemplary cylinder.
Figure 40:
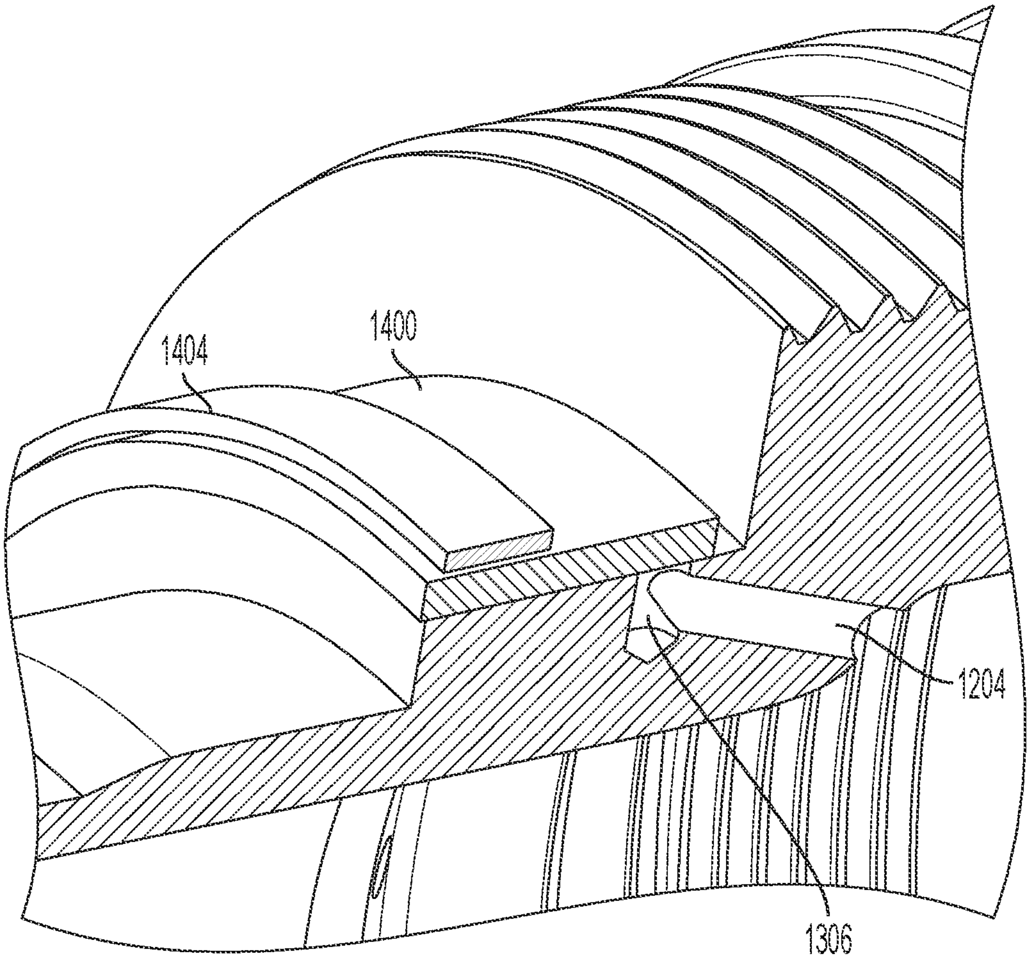
FIG. 40 is a cross-sectional view of the cylinder of FIG. 39, showing a sealing member.

In other embodiments, as shown in FIGS. 37 and 38, the pressure release mechanism 1200 is an O-ring 1300. The O-ring 1300 sits in an angled groove 1304 on the surface of the cylinder 18, proximate the aperture 1204. The O-ring 1300 seals an opening 1306 to the aperture 1204, such that fluid cannot exit the opening 1306 of the aperture 1204 without movement of the O-ring 1300. The O-ring 1300 is formed from an elastic material such that the O-ring 1300 flexes when stretched. When the pressure within the cylinder 18 reaches a predetermined level, the pressure within the cylinder 18 stretches the O-ring 1300 such that air may escape from the cylinder 18, into the storage chamber cylinder 30. In other embodiments, as shown in FIGS. 39 and 40, the O-ring 1300 may be replaced with a band 1400. Similar to the O-ring 1300, the band 1400 seals the opening 1306 of the aperture 1204. The band 1400 is formed from an elastomeric material such that the band 1400 is flexible. In some embodiments, a band clamp 1404 may be positioned on a portion of the band 1400 to maintain the position of the band 1400 on the surface of the cylinder 18. In other embodiments, the band clamp 1404 may not be included.

Figure 41:
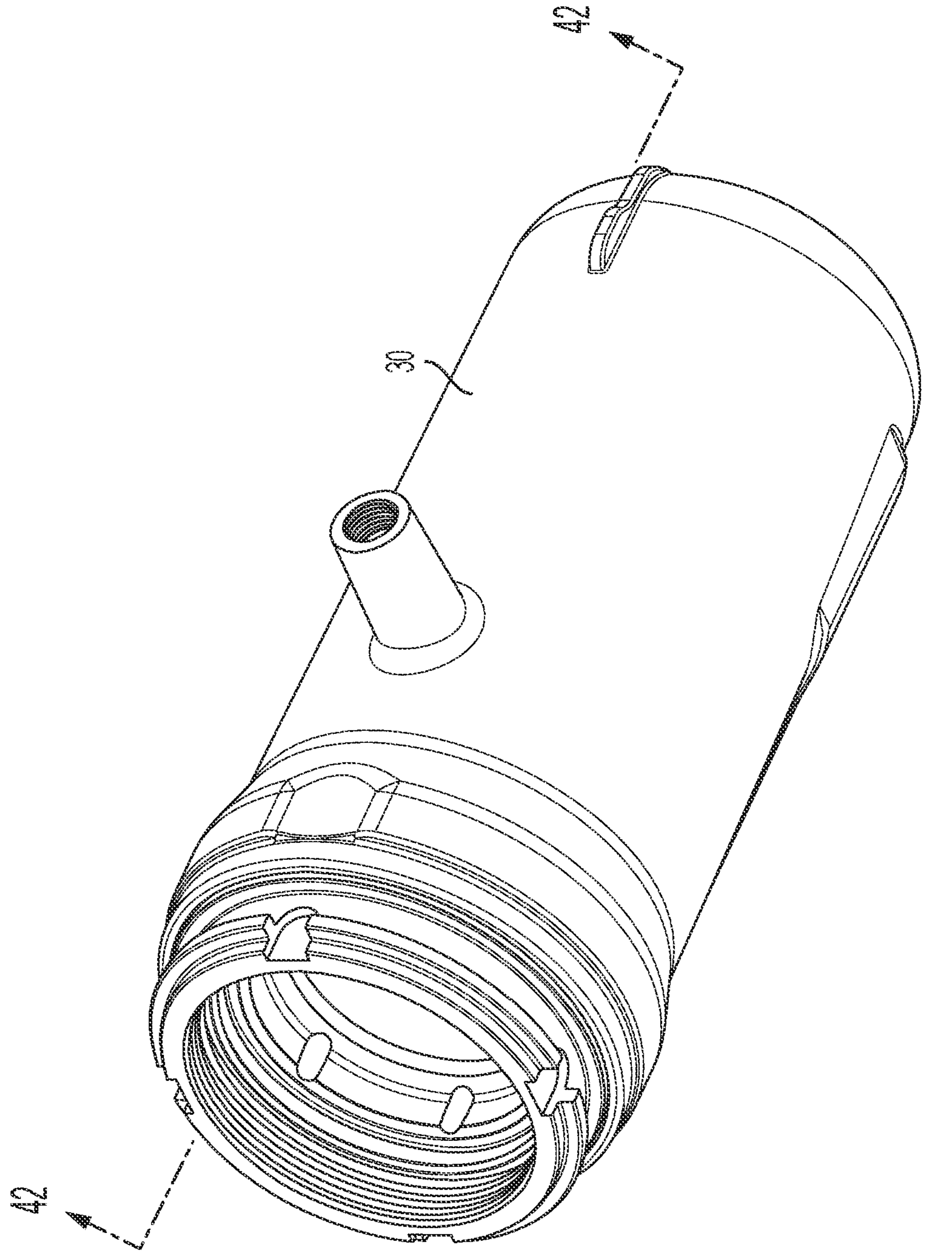
FIG. 41 is a perspective view of another exemplary cylinder.
Figure 42:
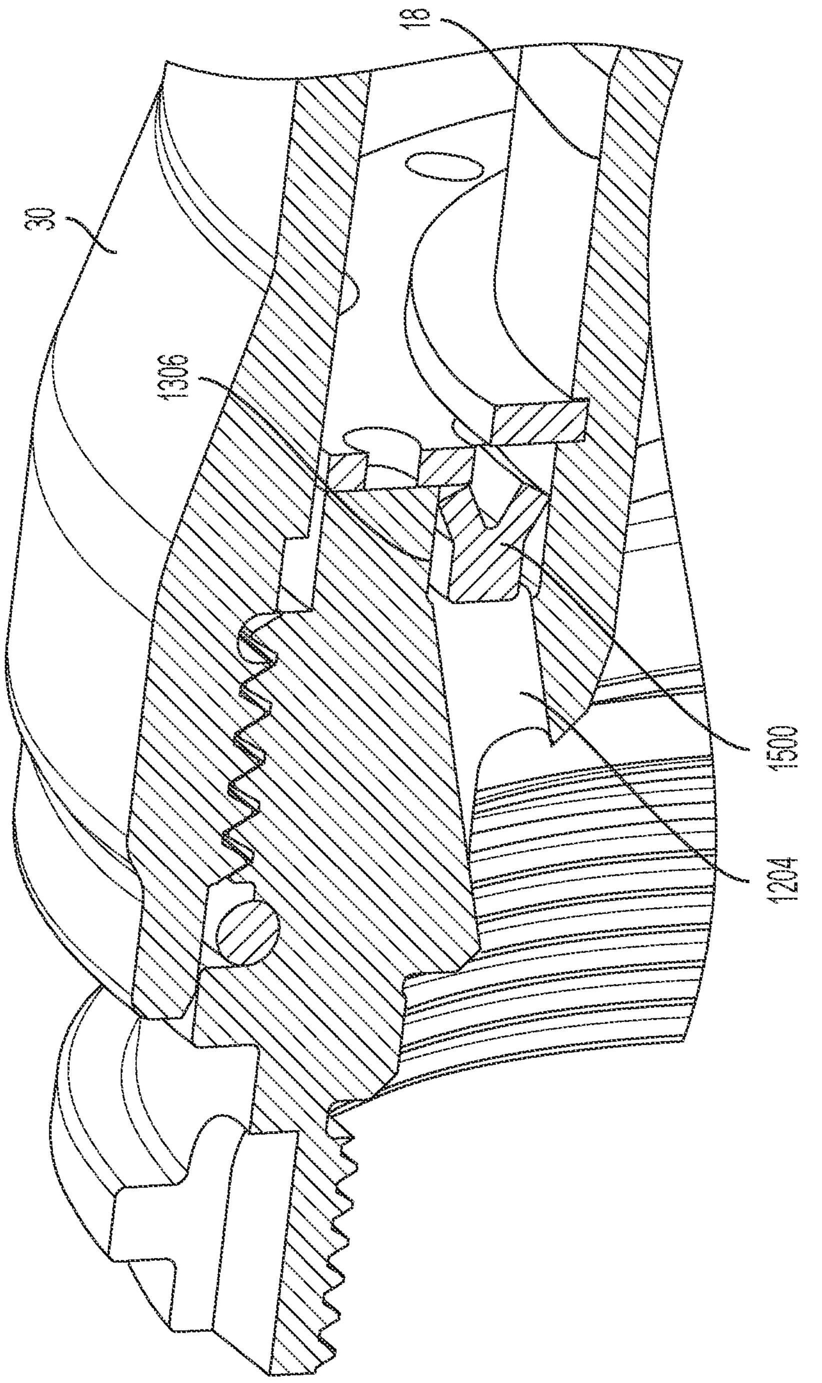
FIG. 42 is a cross-sectional view of the cylinder of FIG. 41, showing a sealing member.

In other embodiments, as shown in FIGS. 41 and 42, the pressure release mechanism 1200 is U-seal 1500 that sits proximate the opening 1306 of the aperture 1204 such that the opening 1306 is sealed. The U-seal 1500 is formed from an elastic material such that the U-seal 1500 flexes when biased. When the pressure within the cylinder 18 reaches a predetermined level, the pressure within the cylinder 18 flexes the U-seal 1500 such that a portion of the U-seal 1500 seals against the surface of the cylinder 18, rather than the opening 1306 of the aperture 1204. In this position, air can escape from the cylinder 18 to the storage chamber cylinder 30. When the pressure within the cylinder 18 is below a predetermined level, the U-seal 1500 again seals against the opening 1306 of the aperture 1204.

Figure 43:
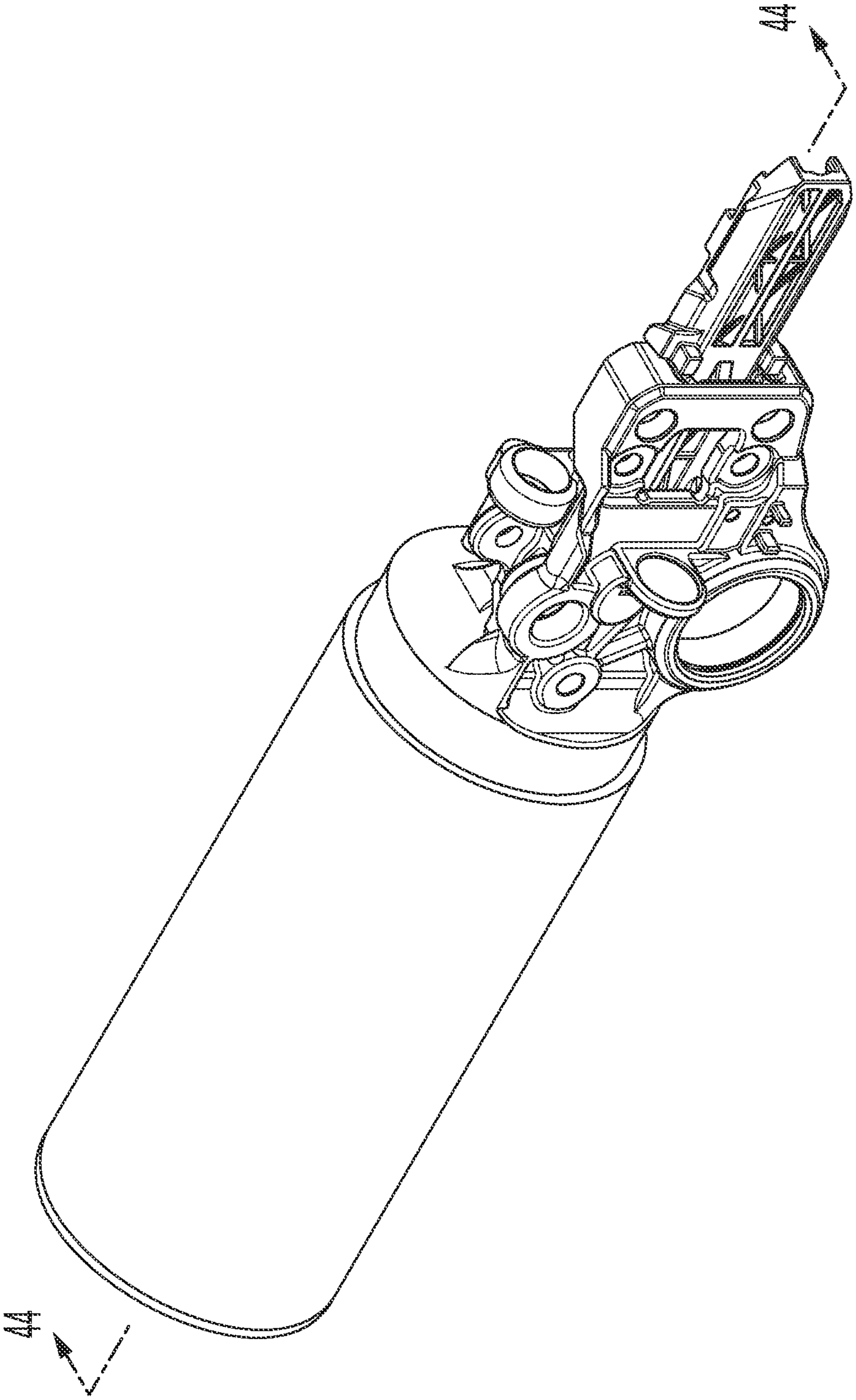
FIG. 43 is a perspective view of a portion of another exemplary gas-spring powered fastener driver.
Figure 44:
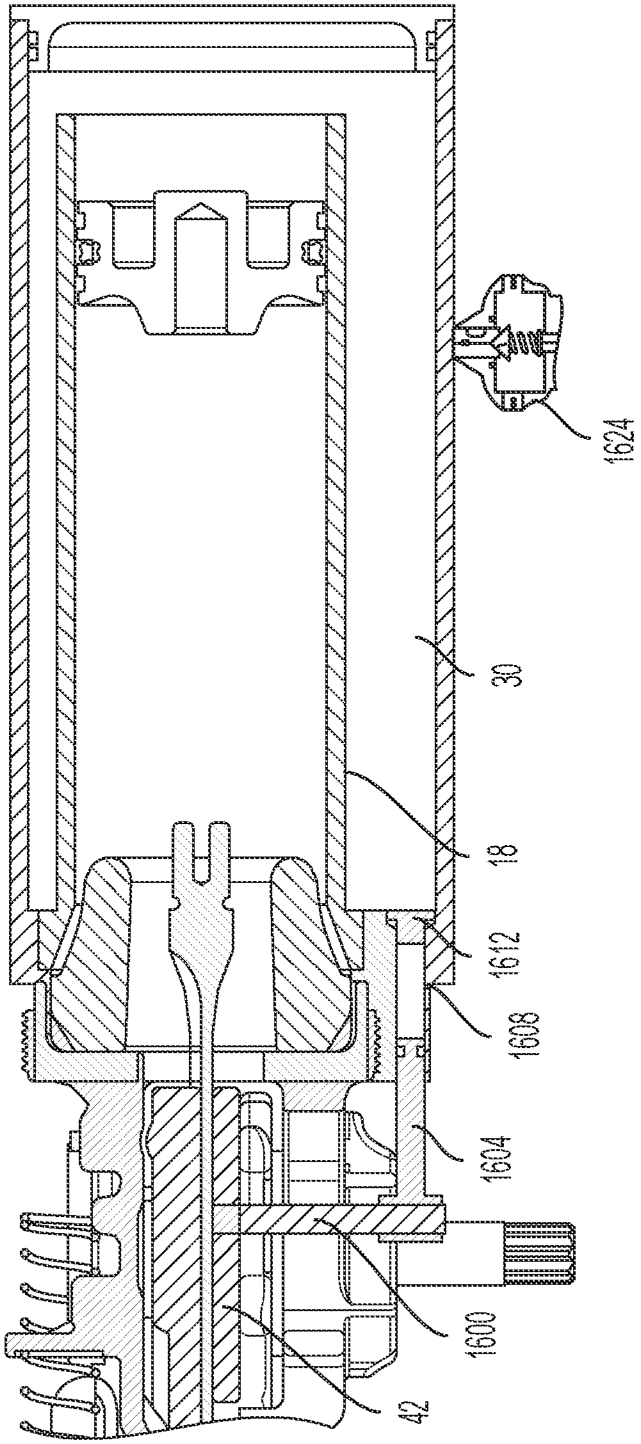
FIG. 44 is a cross-sectional view of the portion of the fastener driver of FIG. 43, showing a pressure increase mechanism.
Figure 45A:
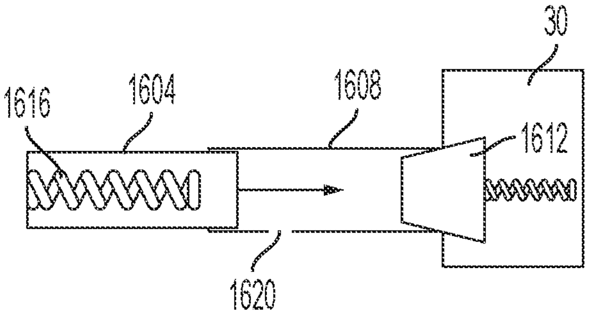
FIG. 45A is a schematic of the portion of the fastener driver of FIG. 43, when a piston of the pressure increase mechanism is in a top-dead-center position.
Figure 45B:
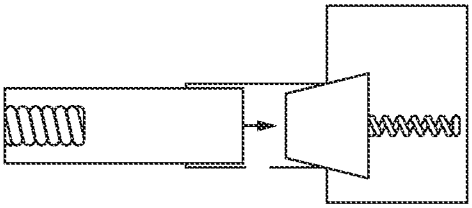
FIG. 45B is a schematic of the fastener driver of FIG. 43, when the piston is being pushed from a top-dead-center position to a bottom-dead-center position, such that air is compressed in an annular space.

In another example, and with reference to FIGS. 43 and 44, the lifter assembly 42 includes a cam 1600 that engages with a small piston 1604. More specifically, when the piston 22 is at the bottom-dead-center position, the lifter assembly 42 urges the cam 1600 to engage with the small piston 1604. The lifter assembly 42 disengages the cam 1600 and the small piston 1604 as the piston moves from the bottom-dead-center position to top-dead-center position. In some embodiments, the cam 1600 may instead engage with a feature on the piston 22. The small piston 1604 is positioned and slidable within an aperture 1608 in the storage chamber cylinder 30. The cam 1600 is configured to bias the small piston 1604 from a small piston top-dead-center position to a small piston bottom-dead-center position, as shown in FIG. 45A. In other words, the cam 1600 biases the small piston 1604 toward the storage chamber cylinder 30. As the cam 1600 biases the small piston 1604 from the small top-dead-center position to the small bottom-dead-center position, the small piston 1604 compresses air in the aperture 1608, increasing the pressure within the aperture 1608, as shown in FIG. 45B.

Figure 45C:
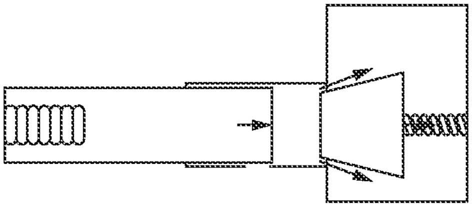
FIG. 45C is a schematic of the fastener driver of FIG. 43, when the piston has compressed air within an annular space, expelling the compressed air into a storage chamber cylinder.
Figure 45D:
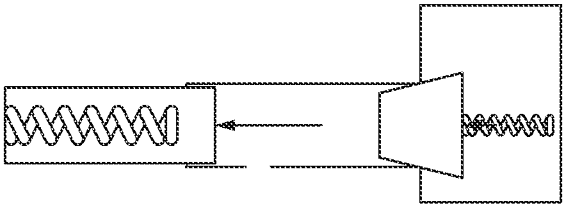
FIG. 45D is a schematic of the fastener driver of FIG. 43, when the piston is being moved from the bottom-dead-center position to the top-dead-center position by a spring.

The aperture 1608 includes a check valve 1612 positioned proximate the small bottom-dead-center position. Once the pressure within the aperture 1608 reaches a predetermined pressure, the check valve 1612 opens, allowing air to enter the storage chamber cylinder 30, increasing the pressure within the storage chamber cylinder 30, as shown in FIG. 45C. The lifter assembly 42 releases the small piston 1604 when the small piston 1604 is in the small bottom-dead-center position. Once the lifter assembly 42 releases the small piston 1604, a spring 1616 on the small piston 1604 biases the small piston 1604 back to the small top-dead-center position, as shown in FIG. 45D. As the small piston 1604 moves to the small top-dead-center position, a vacuum is created within the aperture 1608. A hole 1620 in the aperture 1608 allows external air to enter the aperture 1608. Thereafter, the small piston 1604 is again urged to the small bottom-dead-center piston by the lifter assembly 42, starting an additional compression cycle. The storage chamber cylinder 30 includes a bleed valve 1624 that allows air to bleed out of the storage chamber cylinder 30 and into the external environment when a predetermined pressure is reached. In other embodiments, the storage chamber cylinder 30 may not include a bleed valve.

Although the invention has been described in detail with reference to certain preferred embodiments, variations and modifications exist within the scope and spirit of one or more independent aspects of the invention as described.

What is claimed is:

1. A gas spring-powered fastener driver comprising:

a cylinder;

a storage chamber cylinder having pressurized air in communication with the cylinder;

a moveable piston positioned within the cylinder;

a driver blade attached to the moveable piston and movable therewith between a top-dead-center position and a bottom-dead-center position, the driver blade defining a driving axis;

a lifter operable to move the driver blade from the bottom-dead-center position toward the top-dead-center position, the lifter is configured to engage the driver blade when moving the driver blade from the bottom-dead-center position toward the top-dead-center position;

a bumper positioned beneath the moveable piston in a vertical direction to absorb impact energy from the moveable piston; and a valve positioned in the storage chamber cylinder;

wherein in response to the moveable piston compressing the bumper while absorbing impact energy from the moveable piston, the valve adds pressurized air from the cylinder to the storage chamber cylinder.

2. The gas spring-powered fastener driver of claim 1, wherein the valve is positioned between the cylinder and the storage chamber cylinder.

3. The gas spring-powered fastener driver of claim 2, wherein the valve is a two-way valve, allowing air to flow from the cylinder to the storage chamber cylinder and from the storage chamber cylinder to the cylinder.

4. The gas spring-powered fastener driver of claim 1, wherein when the moveable piston impacts the bumper, an air reservoir is created between the cylinder and the bumper, and wherein the air reservoir is fluidly sealed.

5. The gas spring-powered fastener driver of claim 4, wherein when a pressure within the air reservoir is increased, the valve is opened.

6. The gas spring-powered fastener driver of claim 4, wherein pressure is added to the air reservoir when the moveable piston is moved from the top-dead-center position toward the bottom-dead-center position.

7. The gas spring-powered fastener driver of claim 1, further comprising a second valve located in the storage chamber cylinder, wherein when a pressure within the storage chamber cylinder reaches a predetermined level, the second valve releases air from within the storage chamber cylinder.

8. A gas spring-powered fastener driver comprising:

a cylinder;

a storage chamber cylinder having pressurized air in communication with the cylinder;

a moveable piston positioned within the cylinder;

a driver blade attached to the moveable piston and movable therewith between a top-dead-center position and a bottom-dead-center position, the driver blade defining a driving axis;

a lifter operable to move the driver blade from the bottom-dead-center position toward the top-dead-center position, the lifter is configured to engage the driver blade when moving the driver blade from the bottom-dead-center position toward the top-dead-center position;

a bumper positioned beneath the moveable piston in a vertical direction to absorb impact energy from the moveable piston; and a valve positioned in the storage chamber cylinder;

wherein the valve is positioned at an end of the cylinder with a sleeve extending from a body of the valve engaging an outer surface of the cylinder, wherein when a pressure within the storage chamber cylinder reaches a predetermined level, the valve opens, wherein the valve includes a leg that extends from the body through an end of the storage chamber cylinder such that the leg is exposed to an external environment, and wherein the valve includes a spring positioned around the leg to bias the body toward the storage chamber cylinder.

9. The gas spring-powered fastener driver of claim 8, wherein when the pressure within the cylinder reaches the predetermined level, the valve is biased toward the end of the storage chamber cylinder, compressing the spring.

10. A gas spring-powered fastener driver comprising:

a cylinder;

a storage chamber cylinder having pressurized air in communication with the cylinder;

a moveable piston positioned within the cylinder;

a driver blade attached to the moveable piston and movable therewith between a top-dead-center position and a bottom-dead-center position, the driver blade defining a driving axis;

a lifter operable to move the driver blade from the bottom-dead-center position toward the top-dead-center position, the lifter is configured to engage the driver blade when moving the driver blade from the bottom-dead-center position toward the top-dead-center position; and a valve positioned between the cylinder and the storage chamber cylinder;

wherein the valve includes an annular flange and an opening, and wherein, when a pressure in the storage chamber cylinder is below a predetermined pressure, the annular flange blocks the opening, and wherein the valve is a two-way valve, allowing air to flow from the cylinder to the storage chamber cylinder and from the storage chamber cylinder to the cylinder.

11. The gas spring-powered fastener driver of claim 10, wherein, when a pressure in the storage chamber cylinder reaches a predetermined pressure, the annular flange inverts, allowing air to escape through the opening.

12. The gas spring-powered fastener driver of claim 10, wherein the valve includes a tapered passageway disposed in a body of the valve, wherein the tapered passageway is configured to assist with providing air flow from the cylinder to the storage chamber cylinder.

13. The gas spring-powered fastener driver of claim 12, wherein when the moveable piston impacts a bumper, air is directed through the tapered passageway into the storage chamber cylinder.

* * * * *